US008176208B2

(12) United States Patent  (10) Patent No.: US 8,176,208 B2
Shishido et al.  (45) Date of Patent: May 8, 2012

(54) STORAGE SYSTEM AND OPERATING METHOD OF STORAGE SYSTEM

(75) Inventors: Toshimitsu Shishido, Kaisei (JP); Katsuhiko Fukui, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 59 days.

(21) Appl. No.: 12/669,158

(22) PCT Filed: Nov. 4, 2009

(86) PCT No.: PCT/JP2009/005855
§ 371 (c)(1),
(2), (4) Date: Jan. 14, 2010

(87) PCT Pub. No.: WO2011/055406
PCT Pub. Date: May 12, 2011

(65) Prior Publication Data
US 2011/0106978 A1 May 5, 2011

(51) Int. Cl.
*G06F 3/00* (2006.01)
(52) U.S. Cl. .......................................................... 710/3
(58) Field of Classification Search .................. 710/3
See application file for complete search history.

(56) References Cited

U.S. PATENT DOCUMENTS

| 7,461,132 | B2 | 12/2008 | Kurokawa et al. | |
| 2002/0034180 | A1* | 3/2002 | Kroeger et al. | 370/392 |
| 2002/0049845 | A1* | 4/2002 | Sreenivasan et al. | 709/226 |
| 2002/0162048 | A1* | 10/2002 | Ackaret et al. | 714/6 |
| 2003/0074592 | A1* | 4/2003 | Hasegawa | 713/324 |
| 2006/0075292 | A1 | 4/2006 | Fukui | |
| 2009/0172666 | A1 | 7/2009 | Yahalom | |

FOREIGN PATENT DOCUMENTS

| EP | 1662368 A1 | 5/2006 |
| EP | 1758017 A1 | 2/2007 |
| JP | 2006-146839 | 6/2006 |

* cited by examiner

*Primary Examiner* — Henry Tsai
*Assistant Examiner* — Juanito Borromeo
(74) *Attorney, Agent, or Firm* — Brundidge & Stanger, P.C.

(57) ABSTRACT

An object is to improve reliability and availability of a storage system.

A single service processor (SVP 20) manages a plurality of storage apparatuses 10. The storage apparatus 10 includes a channel substrate 11, a drive substrate 13, a cache memory 14, and a processor substrate 12 as well as a sub-service processor (SSVP 18) that has an environment monitor unit 181 acquiring operation state information and a service processor monitoring unit (SVP monitoring unit 182) monitoring a SVP 20 and that is coupled to the processor substrate 12. The SVP 20 includes a communication control unit 203 coupled via a communication network 52 to the respective processor substrates 12 of the storage apparatuses 10 and a power control unit 205 coupled via a communication line to the SSVP 18 and powering off or on the SVP 20 according to a control signal sent from the SVP monitoring unit 182 via the communication line 55.

12 Claims, 22 Drawing Sheets

PLEASE SET ID SWITCH OF ADDITIONALLY
PROVIDED STORAGE APPARATUS

FIG. 15

ADDRESS ALLOCATION MANAGEMENT TABLE 187

| SET VALUE OF ID SWITCH | | | | CORE 0 | FOURTH OCTET OF MP1 | | | FOURTH OCTET OF MP2 | | | |
| --- | --- | --- | --- | --- | --- | --- | --- | --- | --- | --- | --- |
| SW4 | SW3 | SW2 | SW1 | CORE 0 | CORE 1 | CORE 2 | CORE 3 | CORE 0 | CORE 1 | CORE 2 | CORE 3 |
| 0 | 0 | 0 | 0 | 40 | 41 | 42 | 43 | 44 | 45 | 46 | 47 |
| 0 | 0 | 0 | 1 | 50 | 51 | 52 | 53 | 54 | 55 | 56 | 57 |
| 0 | 0 | 1 | 0 | 60 | 61 | 62 | 63 | 64 | 65 | 66 | 67 |
| 0 | 0 | 1 | 1 | 70 | 71 | 72 | 73 | 74 | 75 | 76 | 77 |
| 0 | 1 | 0 | 0 | 80 | 81 | 82 | 83 | 84 | 85 | 86 | 87 |
| 0 | 1 | 0 | 1 | 90 | 91 | 92 | 93 | 94 | 95 | 96 | 97 |
| 0 | 1 | 1 | 0 | 100 | 101 | 102 | 103 | 104 | 105 | 106 | 107 |
| 0 | 1 | 1 | 1 | 110 | 111 | 112 | 113 | 114 | 115 | 116 | 117 |
| 1 | 0 | 0 | 0 | 120 | 121 | 122 | 123 | 124 | 125 | 126 | 127 |

FIG. 16

| APPARATUS No. (ID) | SERIAL NUMBER | IP ADDRESS OF SVP | IP ADDRESS | |
| --- | --- | --- | --- | --- |
| | | | MP1(Core0-3) | MP2(Core0-3) |
| 1 | AAAA | 126.xxx.xxx.15 | 126.xxx.xxx.40-43 | 126.xxx.xxx.44-47 |
| 2 | BBBB | | 126.ccc.ddd.50-53 | 126.ccc.ddd.54-57 |
| . . . | . . . | | . . . . . | . . . . . |

UPDATE    OK

FIG. 17

| APPARATUS No. (ID) | SERIAL NUMBER | IP ADDRESS OF SVP | IP ADDRESS | |
|---|---|---|---|---|
| | | | MP1(Core0-3) | MP2(Core0-3) |
| 1 | AAAA | 126.xxx.xxx.15 | 126.xxx.xxx.40-43 | 126.xxx.xxx.44-47 |
| 2 | BBBB | | 126.xxx.xxx.50-53 | 126.xxx.xxx.54-57 |
| . . . | . . . | | . . . . . | . . . . . |

[UPDATE] [OK]

FIG. 19

| Master/Slave | STORAGE APPARATUS IDENTIFIER | IP ADDRESS | CONFIGURATION INFORMATION | LOG INFORMATION | | | |
|---|---|---|---|---|---|---|---|
| | | | | Error Log | SSB Log | History Log | etc |
| Master | ⊟DKC1(10001) | 126.xxx.xxx.40, 44 | AAA | BBB | Bbb | BBb | ... |
| | | 126.xxx.xxx.41, 45 | | CCC | Ccc | CCc | ... |
| | | 126.xxx.xxx.42, 46 | | DDD | Ddd | DDd | ... |
| | | 126.xxx.xxx.43, 47 | | EEE | Eee | EEe | ... |
| | ⊞DKC2(10002) | 126.xxx.xxx.50 | xxxxxx | xxxxxx | xxxxxx | xxxxx | xxxxx |
| | | 126.xxx.xxx.57 | . | . | . | . | . |
| | ⊞DKC3(10003) | 126.xxx.xxx.60 | xxxxxx | xxxxxx | xxxxxx | xxxxx | xxxxx |
| | | 126.xxx.xxx.67 | . | . | . | . | . |
| | . | . | | | | | |
| Slave | ⊞DKC1(10101) | 126.xxx.yyy.40 | xxxxxx | xxxxxx | xxxxxx | xxxxx | xxxxx |
| | | 126.xxx.yyy.47 | . | . | . | . | . |
| | ⊞DKC2(10102) | 126.xxx.yyy.50 | xxxxxx | xxxxxx | xxxxxx | xxxxx | xxxxx |
| | | 126.xxx.yyy.57 | . | . | . | . | . |
| | . | . | | | | | |

FIG. 21

STORAGE SYSTEM AND OPERATING METHOD OF STORAGE SYSTEM

TECHNICAL FIELD

The present invention relates to a storage system and an operating method of a storage system, and more particularly to a technology of improving reliability and availability of a storage system.

BACKGROUND ART

PTL 1 discloses a storage controller with a configuration including a channel adaptor (CHA), a disc adaptor (DKA), a cache memory (CM), and a shared memory (SM) coupled to each other via a interconnecting logical unit. The storage controller includes an environment monitoring unit that monitors the environmental state thereof, a service processor (SVP), which is a device used for maintenance and management of the storage controller by an administrator, and a sub-service processor (SSVP) that converts environmental state information received from the environment monitoring unit into a format that can be interpreted by the SVP to notify the SVP of the environmental state information.

CITATION LIST

Patent Literature

PTL 1
Japanese Patent Application Laid-Open Publication No. 2006-146839

SUMMARY OF INVENTION

Technical Problem

The configuration with storage controllers (hereinafter referred to as storage apparatus) including respective SVPs as in Patent Document 1 requires to be provided with an SVP each time a new storage apparatus is provided. When SVPs are made redundant, twice the number or more SVPs need to be arranged. As the number of SVPs increases, the frequency of failure such as freezing of an operating system running on the SVPs is increased and the reliability and the availability of a storage system is reduced. Since a multiple of communication cables need to be laid to couple SVPs and SSVPs, the cost of laying is increased, and the frequency of failure is also increased due to the noise effect and falling-out of the cables.

The present invention was conceived in view of the above background and it is therefore an object of the present invention to provide a storage system and an operating method of a storage system capable of improving reliability and availability of a storage system.

Solution to Problem

An aspect of the present invention to achieve the above object provides a storage system comprising:
 a plurality of storage apparatuses, each including
 one or more channel substrates that receive a data I/O request sent from an external apparatus,
 one or more drive substrates that write data into a storage device configured of a plurality of storage drives or that read data from the storage device,
 a cache memory that stores write data to be written into the storage device or read data read from the storage device,
 a processor substrate that is responsible for data transfer performed between at least any of the channel substrate, the drive substrate, and the cache memory, and
 a sub-service processor that has an environment monitor unit to acquire operation state information that is information indicative of an operational state and a service processor monitoring unit to monitor a service processor, the sub-service processor being communicatively coupled to the processor substrate; and
 a service processor including
 a communication control unit communicatively coupled via a communication network to the respective processor substrates of the storage apparatuses and
 a power control unit communicatively coupled via a communication line to the sub-service processor, the power control unit powering off or on the service processor according to a control signal sent from the service processor monitoring unit via the communication line, the service processor managing the plurality of the storage apparatuses.

In the storage system of the present invention, the service processor is configured separately from the storage apparatus, the service processor communicates with the processor substrate in the storage apparatus via a communication network. The processor substrate and the sub-service processor are communicatively coupled within the storage apparatus and this enables the processor substrate to acquire event information output from such as an operating system operating on each of the channel substrate, the drive substrate, and cache memory and to acquire operational state information from the service processor monitoring unit.

As above, in the storage system of the present invention, the service processor provided external to the storage apparatus and the processor substrate of the storage apparatus are communicatively coupled and this enables the service processor to manage a plurality of storages apparatuses via the communication network. Therefore, it is not necessary to provide a service processor for each of the storage apparatuses and so the operational cost of the storage system can be reduced. Since the number of the service processors is reduced, the frequency of failure of the service processor is reduced and thus the reliability and the availability of the storage system can be improved.

Another aspect of the present invention provides a storage system, wherein
 the sub-service processor includes an address setting unit that is a user interface for setting a fourth octet of an IP address designated to the processor substrate in the communication network and generates the fourth octet based on a set value of the address setting unit,
 the processor substrate acquires the fourth octet from the sub-service processor and transmits the acquired fourth octet to the service processor,
 the service processor generates an IP address using the fourth octet as a fourth octet and transmits the generated IP address to the processor substrate,
 the processor substrate receives the IP address and sets the received IP address as the network address of the processor substrate in the communication network.

According to the present invention, the sub-service processor of the storage apparatus generates the fourth octet of an IP address based on a set value set in the address setting unit, the processor substrate transmits the fourth octet to the service processor; the service processor generates an IP address using the fourth octet received as a fourth octet and transmits the generated IP address to the processor substrate; and the processor substrate sets this IP address as an IP address of its own.

In this way, the fourth octet of the IP address designated to the processor substrate of the storage apparatus is determined by the set value of the address setting unit. Therefore, when the service processor manages a plurality of storage apparatuses, unique IP addresses on the communication network may be designated to the respective storage apparatuses to be managed and the IP addresses can be designated to the storage apparatuses in accordance with a typical IP address adding mode prescribed by NIC (internet's Network Information Center), i.e., an adding mode for uniquely adding a fourth octet to each of apparatuses on the communication network. This reduces the burden of managing IP addresses designated to the storage apparatuses and the expansion of the storage apparatus and the configuration change in the communication network may easily and flexibly be supported.

Yet another aspect of the present invention provides the storage system, wherein the processor substrate has a multi-core processor having a plurality of core processors individually communicable with the service processor via the communication interface, the sub-service processor generates the fourth octets for the respective core processors based on the set value of the address setting unit, the processor substrate acquires the fourth octets of the respective core processors from the sub-service processor and transmits the acquired fourth octets to the service processor, the service processor generates IP addresses of the respective core processors using the fourth octets of the core processors as fourth octets and transmits the generated IP addresses of the respective core processors to the processor substrate, and the processor substrate receives the IP addresses for the respective core processors and sets the received IP addresses of the respective core processors as IP addresses of the respective core processors in the communication network.

When the processor of the processor substrate is a multi-core processor, an IP address of each of the core processors is set by using the fourth octet based on the set value of the address setting unit in the same manner as described above. Therefore, the above IP address setting method is applicable to a case where the processor of the processor substrate is a multi-core processor.

Still another aspect of the present invention provides the storage system, wherein the processor substrate receives event information that is information relating to an event occurring in each of the channel substrate, the drive substrate, and the cache memory, and receives the operational state information from the sub-service processor, generates and stores log information that is information based on the event information or the operational state information, and transmits the stored log information to the service processor via the communication network, and the service processor receives and stores the log information sent from each of the storage apparatuses.

In this way, the processor substrate receives event information from each of the channel substrate, the drive substrate, and the cache memory, receives operational state information from the sub-service processor, generates and stores log information based on the event information or the operational state information, and transmits the stored log information to the service processor via the communication network. In this way, in the storage system of the present invention, the processor substrate manages log information and provides the managed log information to the service processor as needed.

Yet still another aspect of the present invention provides the storage system, wherein the processor substrate has a multi-core processor having a plurality of core processors individually communicable with the service processor via the communication interface, the processor substrate acquires a load of each of the core processors when generating the log information, and when a load of the core processor responsible for generating the log information is equal to or greater than a preset threshold value, the processor substrate generates the log information with the core processor after distributing the load of the core processor to another core processor on the processor substrate.

According to the present invention, when generating log information, the processor substrate appropriately distributes the load of the core processor responsible for generating log information and then makes the core processor generate log information. This prevents the core processor responsible for generating the log information from being imposed an excessive load and prevents the service to the host apparatus from being affected by making the core processor generate the log information.

Still yet another aspect of the present invention provides the storage system, wherein the processor substrate has a multi-core processor having a plurality of core processors individually communicable with the service processor via the communication interface, the processor substrate acquires a load of each of the core processors when transmitting the log information to the service processor, and when a load of the core processor responsible for the transmission of the log information is equal to or greater than a preset threshold value, the processor substrate transmits the log information to the service processor with the core processor after distributing the load of the core processor to another core processor on the processor substrate.

According to the present invention, when transmitting log information to the service processor, the processor substrate appropriately distributes the load of the core processor responsible for transmitting the log information and then makes the core processor transmit the log information. This prevents the core processor responsible for transmitting the log information from being imposed an excessive load and restrains the service to the host apparatus from being affected by making the core processor transmit the log information.

A further aspect of the present invention provides the storage system, wherein the processor substrate monitors the log information as needed, determines via the communication network whether or not the service processor is powered off when detecting an occurrence of a certain failure in the storage apparatus from the monitoring, and transmits the log information to the service processor via the communication network after powering on the service processor via the communication line by controlling the service processor monitoring unit when the service processor is powered off.

According to the present invention, when detecting a failure of the storage apparatus based on log information, the processor substrate automatically turns on the power of the service processor and transmits the log information to the service processor. In this way, a maintenance personnel of the storage apparatus or the like may refer to the log information of the storage apparatus immediately after arrival at the site. Therefore, the maintenance personnel or the like can quickly take appropriate countermeasures.

A yet further aspect of the present invention provides the storage system, wherein the processor substrate monitors via the communication network as needed whether or not the service processor is operating properly and powers off and on the service processor via the communication line by controlling the service processor monitoring unit when it is determined that the service processor is not operating properly.

In this way, when the processor substrate determines that the service processor is not operating properly, it automatically turns off and on the power of the service processor in an attempt to recover the service processor. Therefore, the reliability and the availability of the storage system can be improved.

A still further aspect of the present invention provides the storage system comprising a first one of the storage apparatuses including the service processor monitoring unit and a second one of the storage apparatuses not including the service processor monitoring unit, the first storage apparatus and the second storage apparatus being communicatively coupled, and the processor substrate of the second storage apparatus monitors via the communication network as needed whether or not the service processor is operating properly and makes a request from the second storage apparatus to the first storage apparatus to power off and on the service processor to cause the first storage apparatus to power off and on the service processor via the communication line by controlling the service processor monitoring unit when it is determined that the service processor is not operating properly.

As above, the storage system of the present invention can be configured with, as the storage apparatuses to be managed by the service processor, a first storage apparatus including a service processor monitoring unit and a second storage apparatus not including a service processor monitoring unit in a mixed state. In this case, when it is determined that the service processor is not operating properly, the processor substrate of the second storage apparatus not including the service processor monitoring unit requests to the first storage apparatus to turn off and on the power of the service processor to cause the first storage apparatus to turn off and on the power of the service processor via the communication line by controlling the service processor monitoring unit.

This can reduce the number of the introduced service processor monitoring units and reduce the introduction cost and the operational cost of the storage system. Since the number of the service processor monitoring units is reduced, the frequency of failure is reduced in the service processor monitoring units and thus the reliability and the availability of the storage system can be improved.

A yet still further aspect of the present invention provides the storage system comprising a first one of the service processors communicatively coupled to a first one of the storage apparatuses to manage the first storage apparatus and a second one of the service processors communicatively coupled to a second one of the storage apparatuses to manage the second storage apparatus, wherein the first service processor and the second service processor are communicatively coupled via a communication network, and the first service processor and the second service processor transmit/receive the log information such that each of the service processors retains the log information stored in the other service processor.

As above, redundancy can be achieved between the service processors provided external to the storage apparatus. Therefore, the reliability and the availability of the storage system can be improved.

A still yet further aspect of the present invention provides the storage system, wherein the first service processor is communicatively coupled to the second storage apparatus, the first service processor and the second service processor mutually monitor their operational states, the first service processor powers off and on the second service processor by controlling the service processor monitoring unit of the second storage apparatus when detecting that a failure has occurred in the second service processor, and the second service processor powers off and on the first service processor by controlling the SVP monitoring unit of the first storage apparatus when detecting that a failure has occurred in the first service processor.

According to the present invention, the operational state is mutually monitored in the configuration that achieves the redundancy between the service processors provided external to the storage apparatus and when a failure is detected at another service processor, the other service processor is powered off and on to attempt recovery. Therefore, the reliability and the availability of the storage system can be improved.

The above and other problems and solutions thereof disclosed herein will become apparent from the following description of the embodiments of the present invention with reference to the accompanying drawings.

ADVANTAGEOUS EFFECTS OF INVENTION

According to the present invention, reliability and availability of a storage system can be improved.

BRIEF DESCRIPTION OF DRAWINGS

FIG. 15 is a diagram of an example of a screen that prompts setting of an ID switch 183 of an additional storage apparatus 10.

FIG. 16 is a diagram of an example of an address allocation management table 187.

FIG. 17 is a diagram of an example of a screen displayed by the SVP 20 to list received IP addresses.

FIG. 19 is a diagram of an example of a screen displayed by the SVP 20 to indicate IP addresses setting contents.

FIG. 21 is a diagram of an example of configuration information and log information stored in respective local memories 122 of the SVPs 20-1, 20-2.

DESCRIPTION OF EMBODIMENTS

Figure 1:
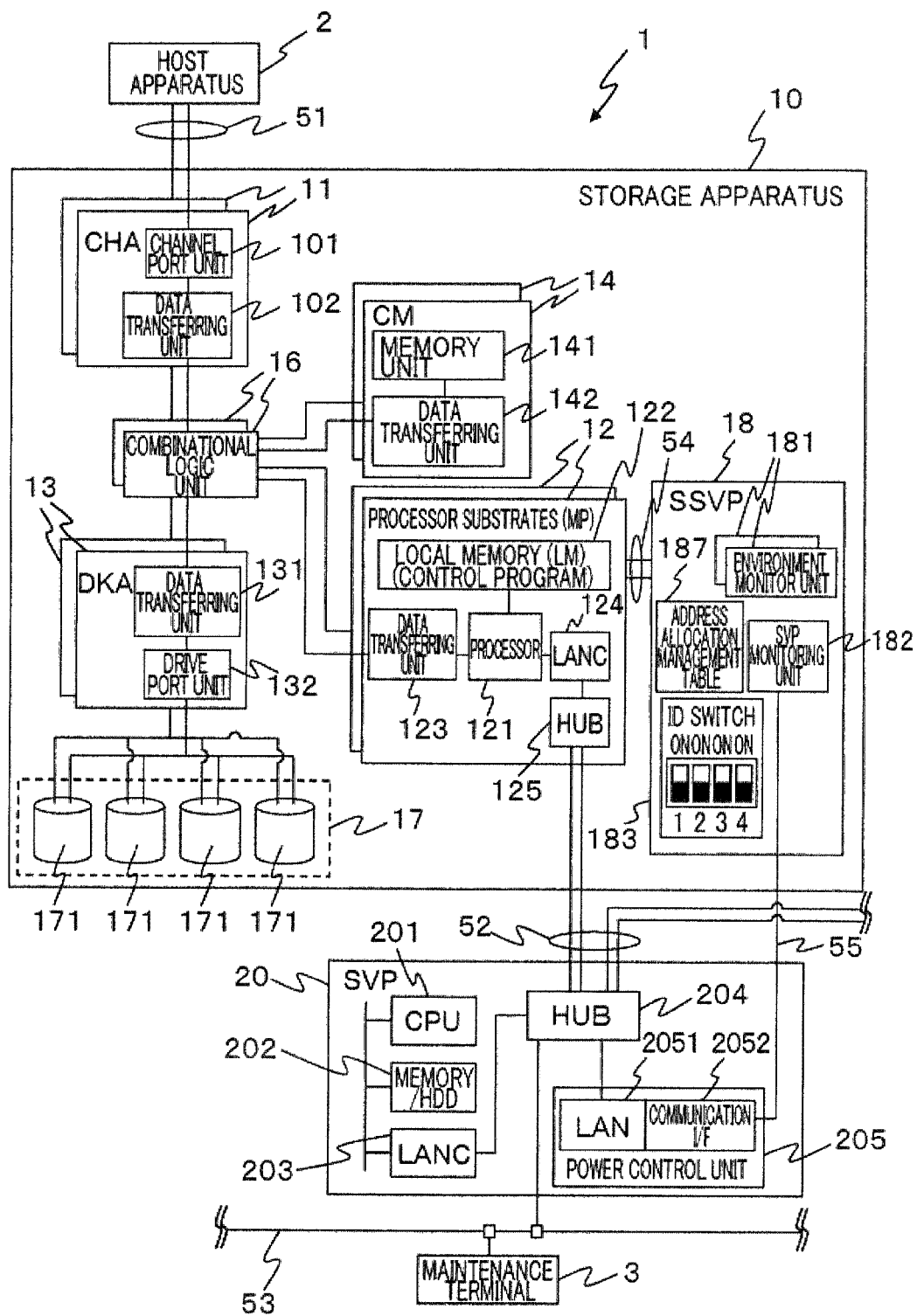
FIG. 1 is a diagram of a configuration of a storage system 1.

Embodiments of the present invention will now be described with reference to the drawings. FIG. 1 depicts a configuration of a storage system 1 described as an embodiment. As depicted in FIG. 1, the storage system 1 includes a storage apparatus 10, a host apparatus 2 (external apparatus) communicatively coupled via a communication network 51 to the storage apparatus 10, an SVP 20 (SerVice Processor) provided separate from the storage apparatus 10, and a maintenance terminal 3 communicatively coupled via a communication network 53 to the SVP 20.

The communication network 51 is LAN (local Area Network), WAN (Wide Area Network), SAN (Storage Area Network), the Internet, a public communication network, a private line or the like. Communication via the communication network 51 are performed in accordance with a protocol such as TCP/IP, iSCSI (internet Small Computer System Interface), Fibre Channel protocol, FICON (Fibre Connection) (registered trademark), ESCON (Enterprise System Connection) (registered trademark), ACONARC (Advanced Connection Architecture) (registered trademark), and FIBARC (Fibre Connection Architecture) (registered trademark).

The communication networks 52, 53 are LAN, WAN, the Internet, a public communication network, a private line or the like. Communication via the communication networks 52, 53 are performed in accordance with a protocol such as TCP/IP.

The host apparatus 2 is an information apparatus (computer) using a storage area provided by the storage apparatus 10 and is, for example, a personal computer, a main frame, or an office computer. The host apparatus 2 transmits a data frame (hereinafter called frame for short) including a data I/O request (such as a data write request and a data read request) to the storage apparatus 10 when accessing the above-mentioned storage area.

The storage apparatus 10 includes one or more channel substrates 11 (CHA in FIG. 1) (CHA: Channel Adaptor), one or more processor substrates 12 (MP in f FIG. 1) (MP: Micro Processor), one or more drive substrates 13 (DKA in FIG. 1) (DKA: Disk Adaptor), cache memories 14 (CM in FIG. 1) (CM: Cache Memory), a combinational logic unit 16, a storage device 17, and an SSVP 18 (sub-service processor (SSVP in FIG. 1) (SSVP: Sub SerVice Processor).

As depicted in FIG. 1, the channel substrates 11, the processor substrates 12, the drive substrates 13, and the cache memories 14 are communicably coupled to each other through the combinational logic unit 16. As depicted in FIG. 1, the channel substrates 11, the processor substrates 12, the drive substrates 13, and the cache memories 14 are all configured to be redundant.

The channel substrate 11 has functions of a channel port unit 101 that communicates with the host apparatus 2 and a data transfer unit 102 that communicates with the processor substrates 12, the drive substrates 13, and the cache memories 14. The channel substrate 11 receives a frame sent from the host apparatus 2 and transmits to the host apparatus 2 a frame including a response (for example, read data, a read completion report, or a write completion report) to the process for the data I/O request included in the received frame. The above-mentioned frame that is transmitted/received is, for example, an FC frame (RC: Fibre Channel) of the Fibre Channel protocol.

Figure 2A:
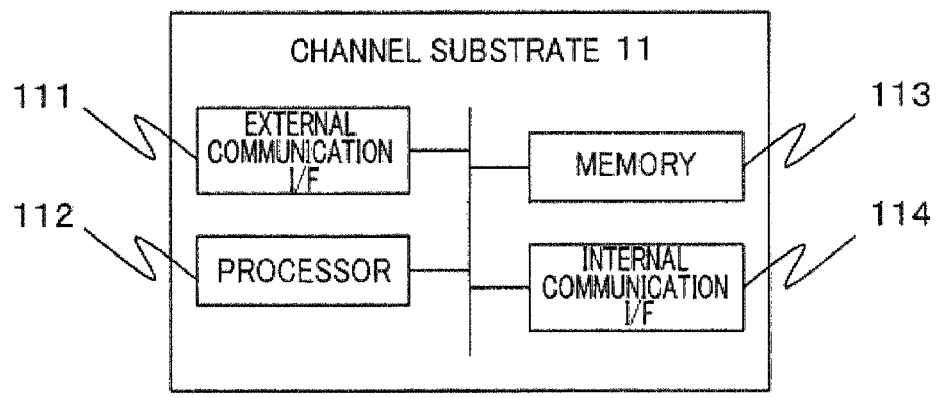
FIG. 2A is a diagram of a hardware configuration of a channel substrate 11.

FIG. 2A depicts a main hardware configuration of the channel substrate 11. As depicted in FIG. 2A, the channel substrate 11 includes an external communication interface (hereinafter, referred to as external communication I/F 111) having a port (communication port) for communicating with the host apparatus 2, a processor 112, a memory 113, and an internal communication interface (hereinafter, referred to as internal communication I/F 114) having a port (communication port) for communicating with the processor substrates 12.

The external I/F 111 is configured with the use of an NIC (Network Interface Card), an HBA (Host Bus Adaptor) and the like. The processor 112 is a CPU (Central Processing Unit), MPU (Micro Processing Unit) and the like, and the memory 113 is a RAM (Random Access Memory) or a ROM (Read Only Memory). The internal I/F 114 communicates with the processor substrates 12, the drive substrates 13, and the cache memories 14 via the combinational logic unit 16.

The processor substrate 12 includes a processor 121 (MPU: Micro Processor Unit), a local memory 122 (LM: Local Memory), a data transfer unit 123, a LANC 124 (communication control unit) (LANC: LAN Controller), and a HUB 125 (network relay device). The processor 121 is a multi-core type processing unit and includes a plurality of core processors 1211 capable of individually executing programs independently of each other. The core processors 1211 can communicate with the SVP individually (independently of each other) via the communication network 52. Note that, although the present embodiment is described to include four core processors 1211 in a single processor 121, the number of the core processors 1211 is not necessarily limited to such.

The data transfer unit 123 is configured with the use of hardware such as DMA (Direct Memory Access) supporting high-speed data transfer. The data transfer unit 123 is responsible for data transfer performed via the combinational logic unit 16 among the channel substrates 11, drive substrates 13, and the cache memories 14. For example, the data transfer unit 123 performs delivery of data (data read from the storage device 17, data written into the storage device 17) between the channel substrate 11 and the drive substrate 13 performed via the cache memory 14 and staging (reading of data from the storage device 17) or destaging (writing into the storage device 17) of data to be stored in the cache memory 14.

The LANC 124 is configured with the used of an NIC (Network Interface Card), an HBA (Host Bus Adaptor) and the like, and is responsible for communication between the processor substrate 12 and other external apparatuses. The HUB 125 is a network switch coupling the processor substrate 12 to the communication network 52 and is a switching hub, for example.

The drive substrate 13 includes a data transfer unit 131 that communicates with the channel substrates 11, the processor substrates 12, and the cache memories 14 and a drive port unit 132 that communicates with the storage device 17. The drive substrate 13 sends/receives data to/from the storage device 17 at the time of reading data from the storage device 17 and writing data into the storage device 17.

Figure 2B:
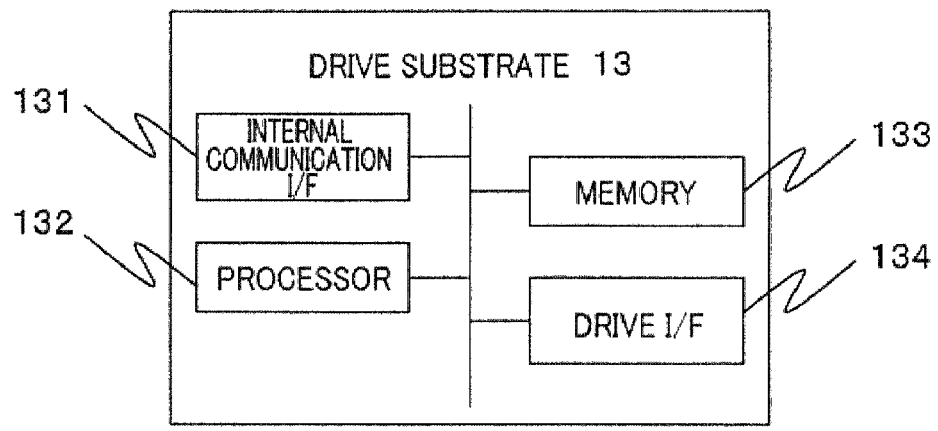
FIG. 2B is a diagram of a hardware configuration of a drive substrate 13.

FIG. 2B depicts a hardware configuration of the drive substrate 13. The drive substrate 13 includes an internal communication interface (hereinafter referred to as internal communication I/F 131), a processor 132, a memory 133, and a drive interface (hereinafter, referred to as drive I/F 134). The internal communication I/F 131 communicates with the channel substrates 11, the processor substrates 12, and the cache memories 14 via the combinational logic unit 16. The processor 132 is configured with the use of a CPU, an MPU and the like. The memory 133 is RAM or ROM, for example. The drive I/F 134 communicates with the storage device 17.

The cache memory 14 includes a memory unit 141 that stores data and a data transfer unit 142. The memory unit 141 is configured with the use of an RAM (Random Access Memory) capable of high-speed access. The memory unit 141 stores data to be written into the storage device 17 (hereinafter referred to as write data) and data read from the storage device 17 (hereinafter referred to as read data). The data transfer unit 142 communicates with the channel substrates 11, the processor substrates 12, and the drive substrates 13 to send/receive data.

The combinational logic unit 16 is configured with the use of a high-speed crossbar switch, for example. Communication performed via the combinational logic unit 16 is performed in accordance with a protocol such as Fibre Channel, iSCSI, TCP/IP and the like.

The storage device 17 includes one or more storage drives 171. The storage drive 171 is, for example, a hard disc drive of the types of SAS (Serial Attached SCSI), SATA (Serial ATA), FC (Fibre Channel), PATA (Parallel ATA), and SCSI or a semiconductor storage device (SSD (Solid State Drive)). The storage device 17 is housed in the same chassis as the storage apparatus 10 or in another chassis.

The storage device 17 provides a storage area in logical units provided by controlling the storage drives 171 in accordance with a control mode such as RAID (Redundant Arrays of Inexpensive (or independent) discs). This logical storage area is a logical device (LDEV 172 (LDEV: Logical Device)) configured with the use of a RAID group (also referred to as a parity group (Parity Group) or array group (Array Group)), for example. The storage apparatus 10 provides a logical storage area (hereinafter referred to as LU (Logical Unit)) configured with the use of LDEV 172 for the host apparatus 2. The storage apparatus 10 manages the correlation between the LU and the LDEV 172 and identifies the LDEV 172 corresponding to the LU or identifies the LU corresponding to the LDEV 172 based on this correlation.

The SSVP 18 includes an environment monitoring unit 181, an SVP monitoring unit 182 (service processor monitoring unit), and an ID switch 183 (address setting unit). The environment monitoring unit 181 monitors the operational state of the storage apparatus 10 in real time and acquires measurement values (hereinafter referred to as operational state information) sent from sensors (such as a temperature sensor, a voltage sensor, a current sensor, a condensation sensor, and a sensor that measures the number of rotations of a cooling fan for cooling the interior of the storage apparatus and the storage drives 171) disposed at various locations of the storage apparatus 10 as needed. The environment monitoring unit 181 is coupled to the processor substrates 12 via communication lines 54 such as exclusive lines and bus lines. The environment monitoring unit 181 transmits/receives control signals and data to/from the processor substrate 12. The environment monitoring unit 181 converts the acquired operational state information into a predetermined data format and supplies it to the processor substrate 12.

The SVP monitoring unit 182 communicates with the SVP 20 via a communication line 55. The communication line 55 is, for example, an RS-232C, a USB (Universal Serial Bus), or LAN. The SVP monitoring unit 182 monitors the operational state (presence of abnormality) of the SVP 20 as needed through a polling mode or a heartbeat mode, for example. When detecting abnormality in the SVP 20, the SVP monitoring unit 182 controls the SVP 20 via the communication line 55 to power off and on the SVP 20 in an attempt to recover the SVP 20.

The ID switch 183 is a user interface configured with the use of, for example, a DIP switch or a dial switch and is used when setting a network address for the processor substrate 12 to perform communication over the communication network 52. The ID switch 183 may be a switch settable by a maintenance personnel and the like. The SSVP 18 generates the above-mentioned network address to be designated to the processor substrate 12 based on a value set to the ID switch 183 and notifies the processor substrate 12 of the generated network address. It is assumed that the network address is an IP address in the present embodiment and the set value of the ID switch 183 is used for setting a fourth octet of the IP address.

Figure 2C:
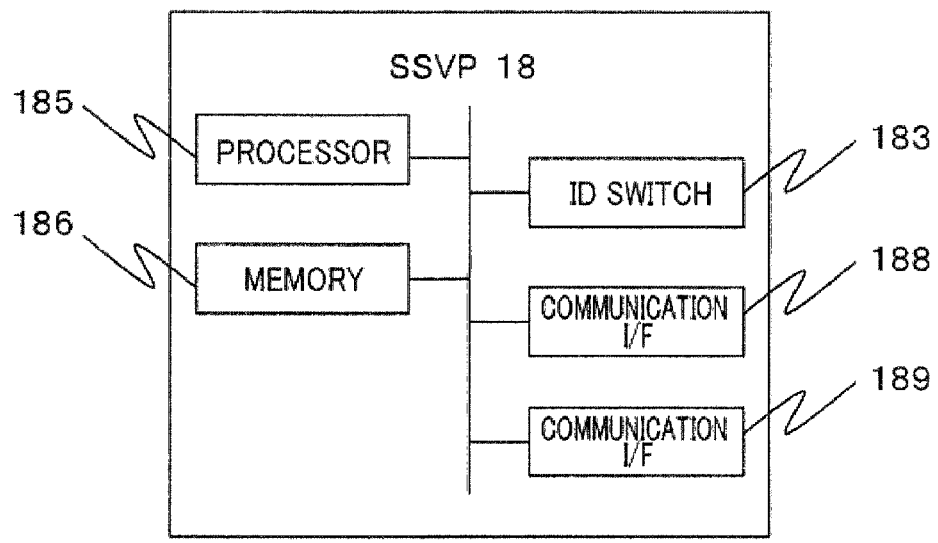
FIG. 2C is a diagram of a hardware configuration of an SSVP 18.

FIG. 2C depicts a hardware configuration of the SSVP 18. The SSVP 18 includes a processor 185, a memory 186, an ID switch 183, a communication interface 188, and a communication interface 189. Of these, the processor 185 is a CPU, an MPU or the like, and the memory 186 is a RAM, a ROM or the like. The communication interface 188 is an interface for communicating with the processor substrate 12 via the communication line 54. The communication interface 189 is an interface for communicating with the SVP 20 via the communication line 55.

As depicted in FIG. 1, the SVP 20 includes a processor 201, a storage device 202, a LANC 203, a HUB 204 (network switch), and a power control unit 205. The SVP 20 is configured with the use of hardware such as a personal computer and a work station, for example. The processor 201 is a CPU, an MPU or the like, and the storage device 202 is a memory, a hard disc drive, an SSD or the like. The LANC 203 is an NIC, an HBA or the like, and communicates with the processor substrate 12 of the storage apparatus 10 via the HUB 204. The HUB 204 is, for example, a switching hub and couples to the HUB 125 of the storage apparatus 10.

The SVP 20 has a function of automatically migrating to a sleep state if no signal is input from outside for a predetermined time. The service of the SVP 20 is stopped in the sleep state and electricity is fed only to the power control unit 205. When a control signal that turns on the power (wake-up signal) is sent from the processor substrate 12 via the communication network 52, the power control unit 205 deletes the sleep state and starts supplying power to the units of the SVP 20 to activate the SVP 20. Since the SVP 20 is normally in a sleep state as above, the frequencies of the freeze (such as suspending of operation of the operating system) of the SVP 20 and the failure of the hard disc drive are reduced so that reliability and availability of the storage system 1 can be improved.

The power control unit 205 includes an interface 2051 for coupling to the HUB 204 and a communication interface 2052 for communicating with the SVP monitoring unit 182 of the SSVP 18. While the SVP 20 provides a service, the power control unit 205 transmits information indicative of the operational state of the SVP 20 (e.g., response to polling from the SVP monitoring unit 182) to the SVP monitoring unit 182 as needed. The power control unit 205 powers on/off the SVP 20 in accordance with a power-on/off instruction sent from the SVP monitoring unit 182.

The maintenance terminal 3 depicted in FIG. 1 is an apparatus operated when a maintenance personnel or the like of the storage system 1 monitors and controls the storage system. The maintenance terminal 3 is configured with the use of a personal computer or an office computer, for example. The maintenance terminal 3 is coupled to the SVP 20 via the communication network 53. The maintenance terminal 3 includes a user interface of a GUI (Graphical User Interface) mode or a CLI (Command Line Interface) mode for controlling and monitoring the storage apparatus 10.

Figure 3:
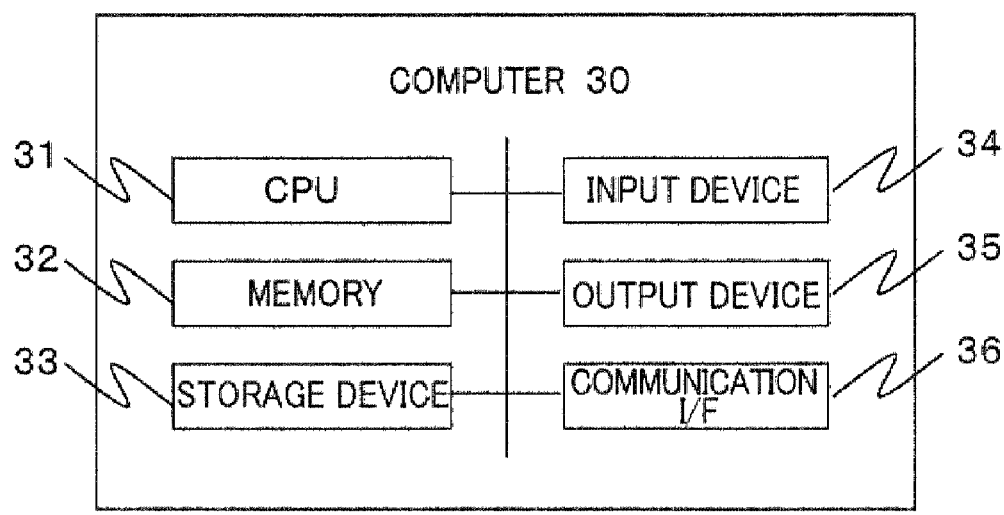
FIG. 3 is a diagram of an example of hardware of a maintenance terminal 3.

FIG. 3 depicts an example of hardware (a computer 30) of the maintenance terminal 3. As depicted in FIG. 3, the computer 30 includes a CPU 31, a volatile or nonvolatile memory 32 (RAM or ROM), a storage device 33 (e.g., hard disc drive, SSD), an input device 34 such as a keyboard or a mouse, an output device 35 such as a liquid crystal monitor or a printer, and a communication interface (referred to as communication I/F 36) such as NIC and HBA.

Figure 4:
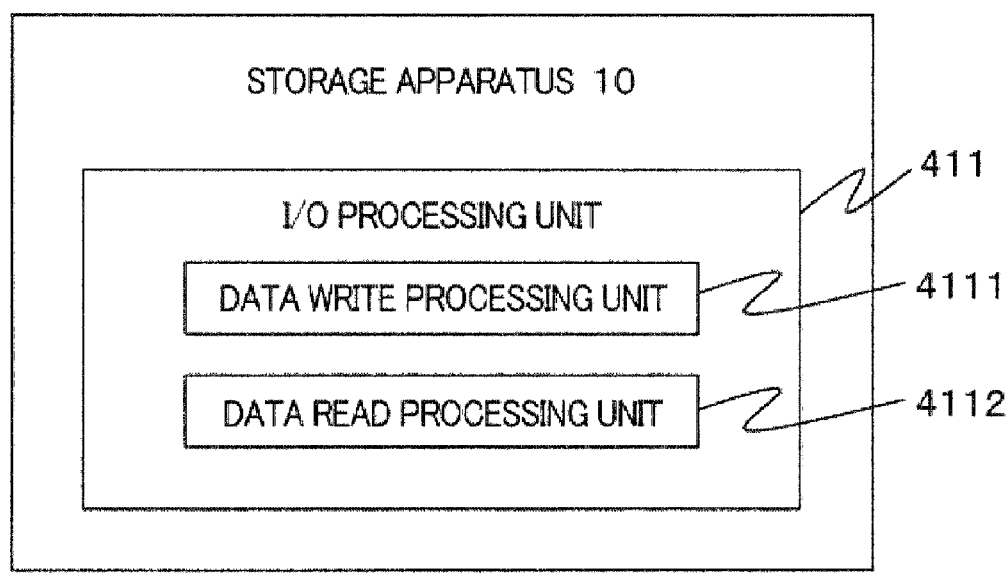
FIG. 4 is a diagram of main functions included in the storage apparatus 10 that relate to a service provided to the host apparatus 2.

FIG. 4 depicts main functions included in the storage apparatus 10 that relate to a service provided to the host apparatus 2. As depicted in FIG. 4, the storage apparatus 10 includes an I/O processing unit 411. The I/O processing unit 411 includes a data write processing unit 4111 that executes a process related to writing into the storage device 17 and a data read processing unit 4112 that executes a process related to reading of data from the storage device 17. The I/O processing unit 411 is implemented by hardware included in the channel substrate 11, the processor substrate 12, and the drive substrate 13 of the storage apparatus 10 or by the processors 112, 122, 132 reading and executing the programs stored in the memories 113, 133.

Figure 5:
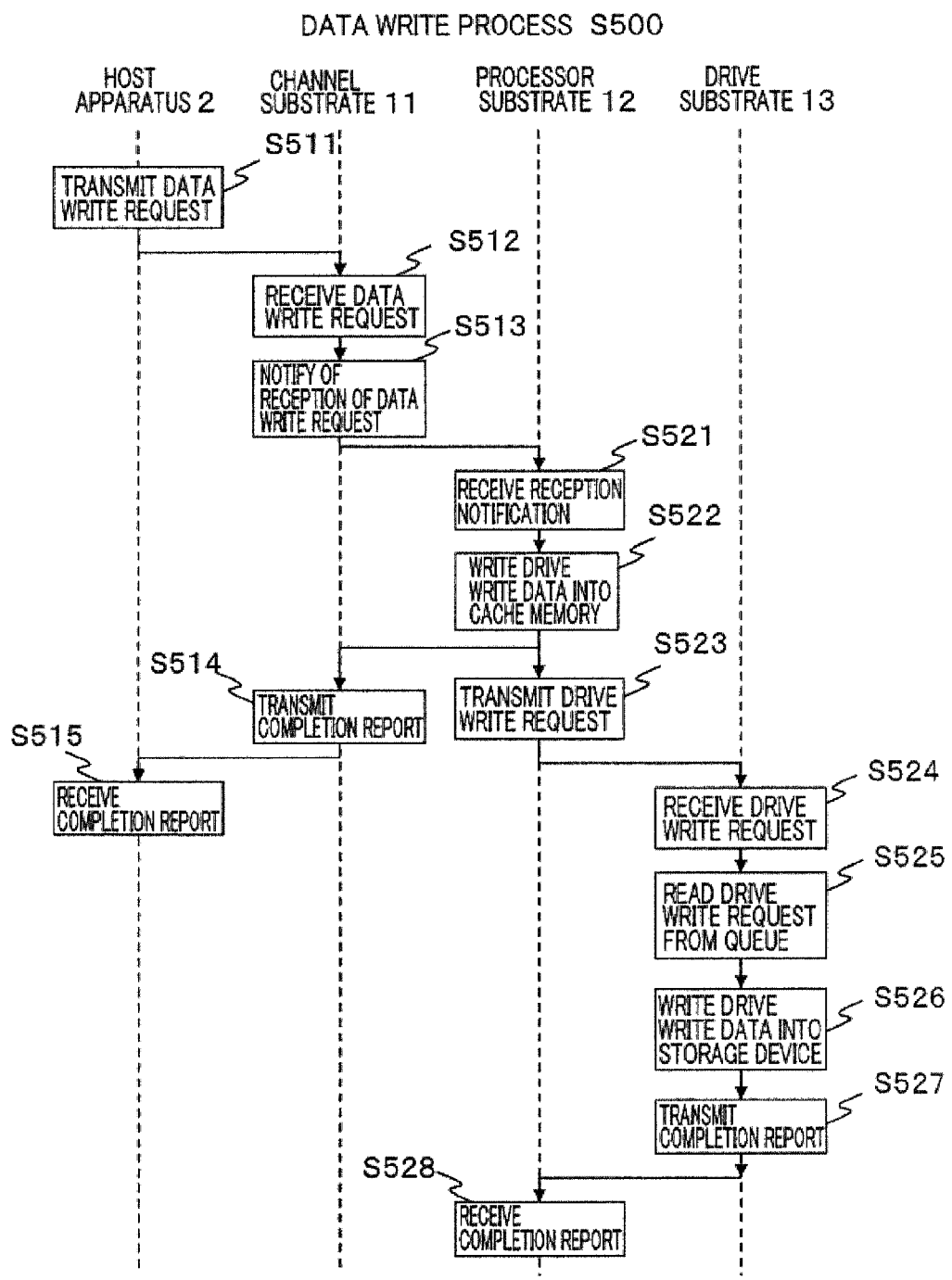
FIG. 5 is a flowchart for explaining a data write process S500.

FIG. 5 is a flowchart for explaining a process (hereinafter referred to as a data write process S500) executed by the data write processing unit 4111 of the I/O processing unit 411 when the storage apparatus 10 receives a frame including a data write request from the host apparatus 2. The data write process S500 will hereinafter be described with reference to FIG. 5. Note that, in the following description, the letter "S" attached at the head of the reference numerals stands for step.

The frame transmitted from the host apparatus 2 is received by the channel substrate 11 of the storage apparatus 10 (S511, S512). When receiving the frame, the channel substrate 11 notifies the processor substrate 12 of the reception (S513).

When receiving the above-mentioned notification from the channel substrate 11 (S521), the processor substrate 12 generates a drive write request based on the data write request of the frame and stores the generated drive write request into the cache memory 14. The processor substrate 12 transmits the generated drive write request to the drive substrate 13 (S522, S523). The channel substrate 11 transmits a completion report to the host apparatus 2 (S514) and the host apparatus 2 receives the completion report (S515).

After the drive substrate 13 receives the drive write request, it registers the request into a write process queue (S524). The drive substrate 13 reads the drive write request from the write process queue as needed (S525). The drive substrate 13 reads from the cache memory 14 the drive write data specified by the drive write request read and writes the drive write data read into the storage drive 171 (S526).

Then the drive substrate 13 notifies the processor substrate 12 of a report (completion report) indicating that the writing of the drive write data has been completed for the drive write request (S527) and the processor substrate 12 receives the completion report sent (S528).

Figure 6:
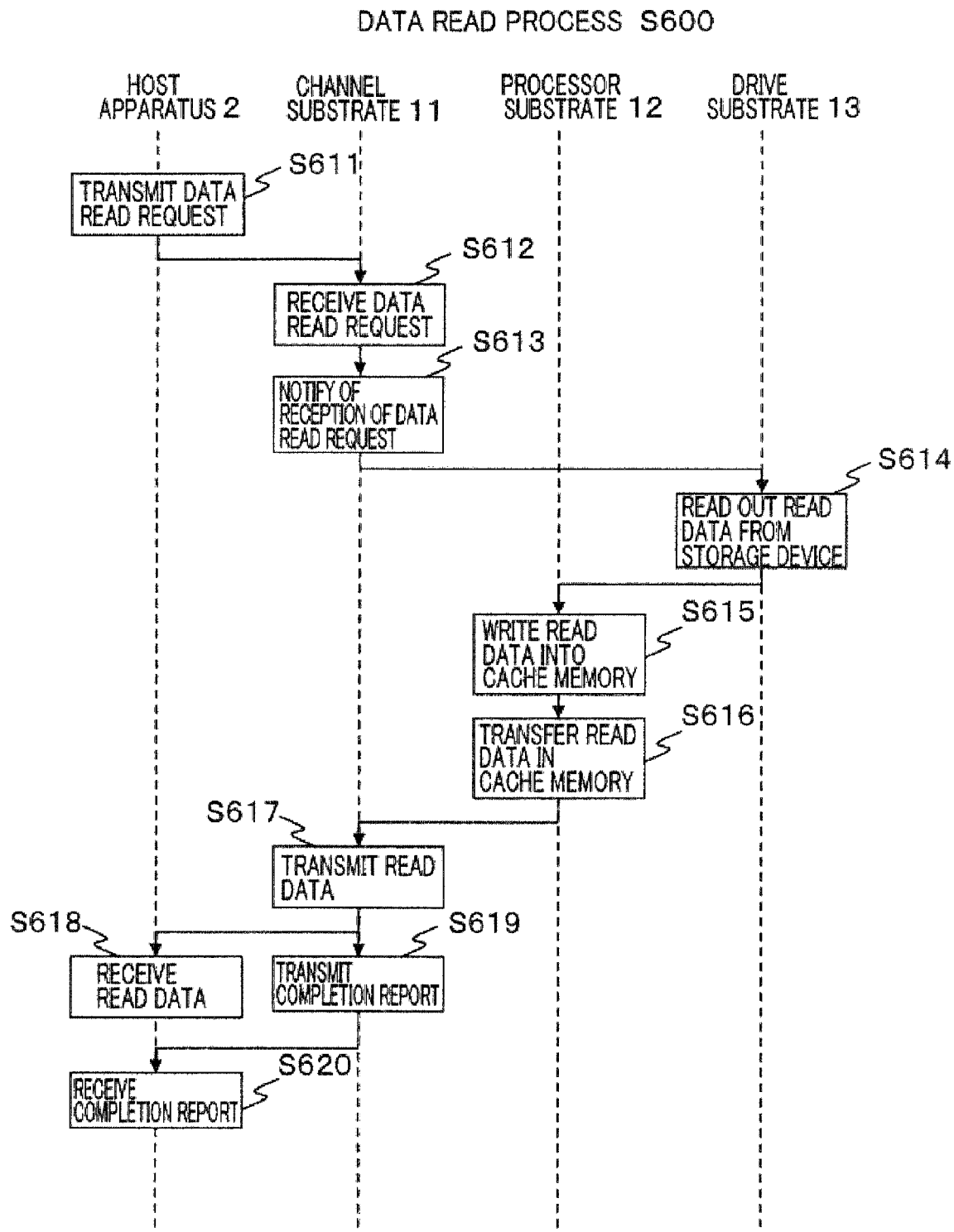
FIG. 6 is a flowchart for explaining a data read process S600.

FIG. 6 is a flowchart for explaining an I/O process (hereinafter referred to as data read process S600) executed by the data read processing unit 4112 of the I/O processing unit 411 of the storage apparatus 10 when the storage apparatus 10 receives a frame including a data read request from the host apparatus 2. The data read process S600 will hereinafter be described with reference to FIG. 6.

The frame transmitted from the host apparatus 2 is received by the channel substrate 11 of the storage apparatus 10 (S611, S612). When receiving the frame from the host apparatus 2, the channel substrate 11 notifies the drive substrate 13 of the reception (S613).

When receiving the above-mentioned notification from the channel substrate 11, the drive substrate 13 reads out from the storage device 17 (the storage drive 171) the data specified by the data read request included in the frame (e.g., specified by LBA (Logical Block Address)) (S614). Note that if the read data exists in the cache memory 14 (in the case of a cache hit), the read process from the storage device 17 (S614) is omitted. The processor substrate 12 writes the data read by the drive substrate 13 into the cache memory 14 (S615). The processor substrate 12 transfers to the communication I/F the data written into the cache memory 14 as needed (S616).

The channel substrate 11 sequentially transmits to the host apparatus 2 the read data sent from the processor substrate 12 (S617, S618). When the transmission of the read data is completed, the channel substrate 11 transmits a completion report to the host apparatus 2 (S619) and the host apparatus 2 receives the sent completion report (S620).

<Multi-Core Processor>

As above, the processor 121 included in the processor substrate 12 is a multi-core type processor and has a plurality of core processors 1211 (hereinafter referred to as also cores) therein. The processes assigned to the respective cores are preliminarily fixed taking into consideration load distribution and the like.

Figure 7:
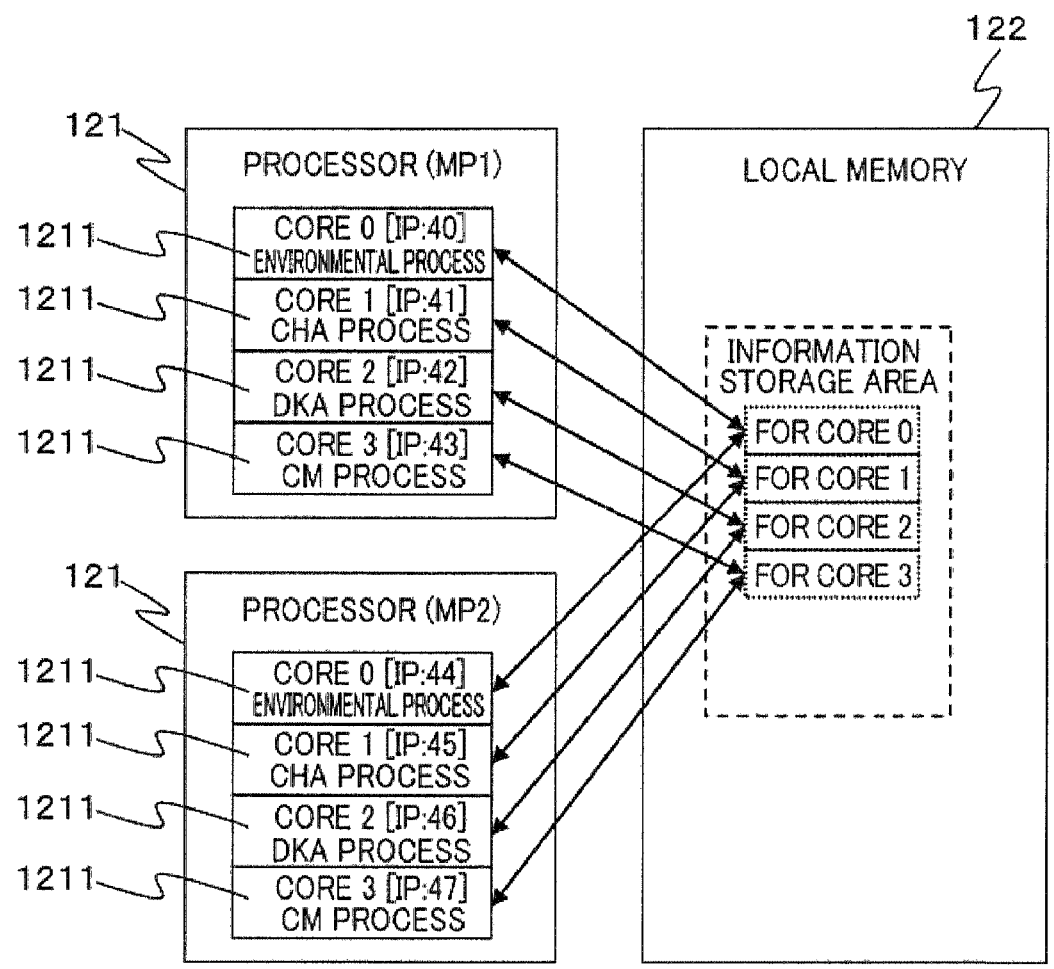
FIG. 7 is a diagram of an example of allocation of processes to cores.

FIG. 7 depicts an example of allocation of processes to the cores. In FIG. 7, a processor 121 (MP1) is the processor 121 mounted on one processor substrate 12 among the processor substrates 12 in redundant configuration and a processor 121 (MP2) is the processor 121 mounted on another processor substrate 12 among the processor substrates 12 in redundant configuration. As depicted in FIG. 7, a process related to the environment monitoring unit 181 (an environmental process in FIG. 7) is allocated to "core 0" of the processors 121 (MP1, MP2); a process related to the channel substrate 11 (a CHA process in FIG. 7) is allocated to "core 1"; a process related to the drive substrate 13 (a DKA process in FIG. 7) is allocated to "core 2"; and a process related to the cache memory 14 (a CM process in FIG. 7) is allocated to "core 3", respectively.

In FIG. 7, descriptions such as [IP:40], [IP:41], . . . IP:47] depicted in the frames of the cores denote the fourth octet values of IP addresses designated to the cores in the communication performed through the communication network 52. An IP address is designated to each of the cores and is a value uniquely designated to each of the cores in the communication network 52. As depicted in FIG. 7, the storage areas of the local memory 122 utilized by the cores are partitioned for the respective cores. The storage areas of the local memory 122 accessed by the cores are shared by the cores of the processors 121 made redundant.

<Functions of Processor Substrate 12>

Figure 8:
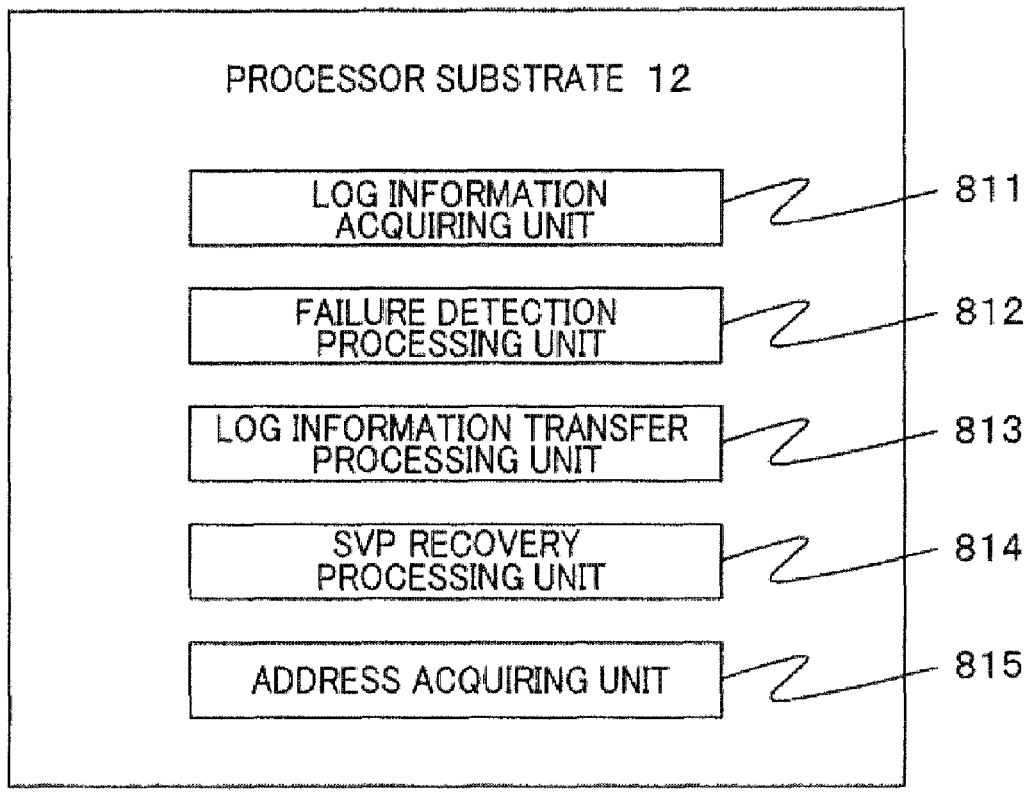
FIG. 8 is a diagram of functions of a processor substrate 12.

The processor substrate 12 further has functions depicted in FIG. 8 in addition to the functions related to the service to the host apparatus 2. These functions are implemented by the processor 121 of the processor substrate 12 reading and executing the programs stored in the local memory 122.

As depicted in FIG. 8, the processor substrate 12 further includes a log information acquiring unit 811, a failure detection processing unit 812, a log information transfer processing unit 813, an SVP recovery processing unit 814, and an address acquiring unit 815 in addition to the functions related to the service to the host apparatus 2. These functions included in the processor substrate 12 are implemented by the processor 121 (the core processor 1211) of the processor substrate 12 executing programs stored in the local memory 122.

The log information acquiring unit 811 acquires information (hereinafter referred to as log information) based on generated events and operational states in the storage apparatus 10 and stores the information in the local memory 122. More specifically, the log information acquiring unit 811 receives event information supplied from the constituent units of the storage apparatus 10 such as the channel substrate 11, the drive substrate 13, and the cache memory 14 (e.g., event information output by hardware of the units or software such as an operating system running on the units) and stores into the local memory 122 the log information that is information describing contents based on the received event information. The log information acquiring unit 811 receives the operational state information sent via the communication line 54 from the environment monitoring unit 181 of the SSVP 18 and stores into the local memory 122 the log information that is information describing contents based on the received operational state information. The log information is individually collected by the respective cores of the processor 121 independently of each other.

Figure 9:
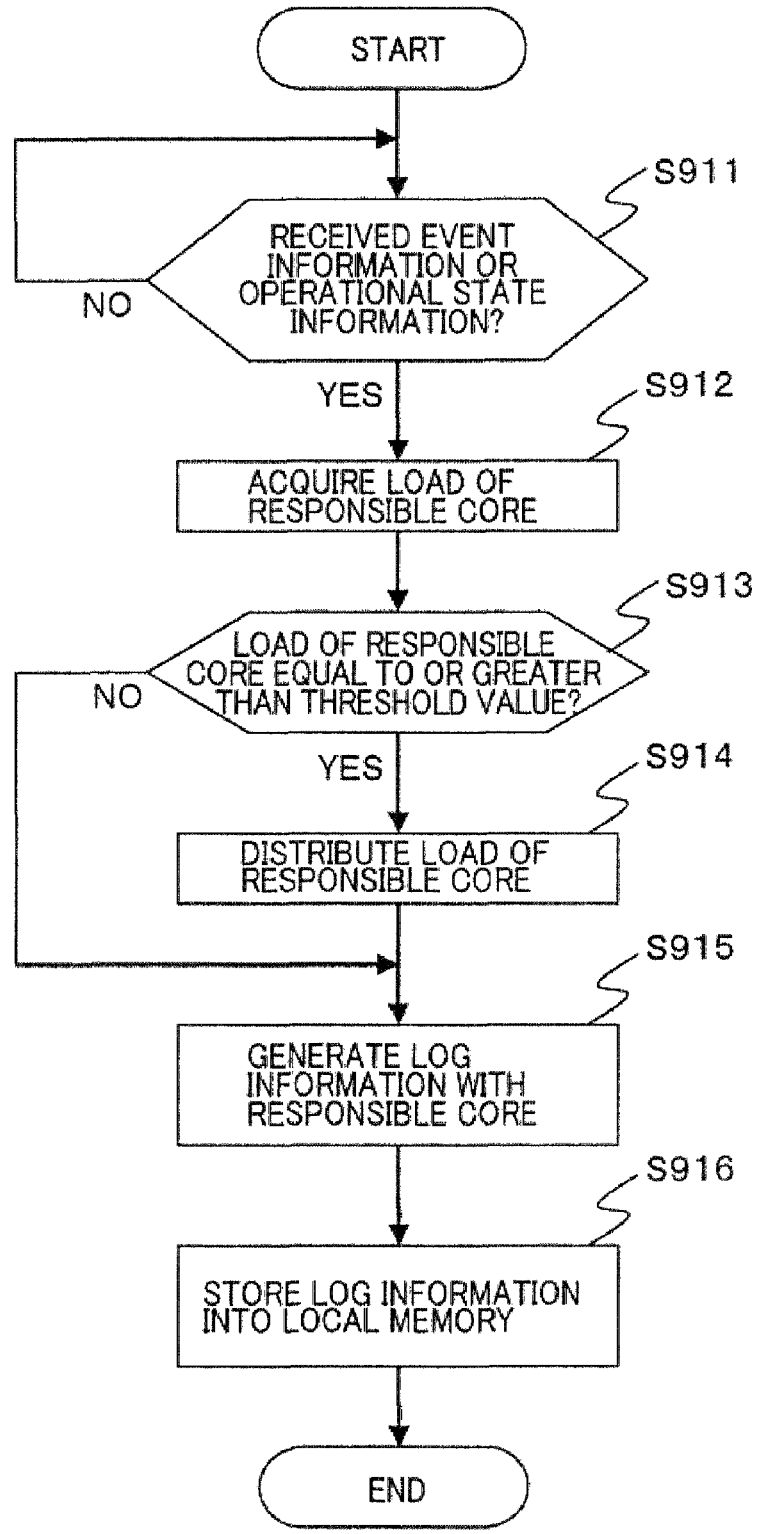
FIG. 9 is a flowchart for explaining a log information acquiring process S900.

FIG. 9 is a flowchart for explaining a process (hereinafter referred to as log information acquiring process S900) performed by the log information acquiring unit 811. The log information acquiring unit 811 monitors reception of the event information from the channel substrate 11, the drive substrate 13, and the cache memory 14 or the event information or the operational state information from the environment monitoring unit 181 in real time (S911). When receiving the event information or the operational state information (S911: YES), the log information acquiring unit 811 acquires a current load (e.g., core utilization rate) of the core responsible for processing the event information or the operational state information (hereinafter referred to as responsible core) among a plurality of the cores of the processor 121 (S912).

The log information acquiring unit 811 determines whether or not the acquired load is equal to or greater than a preset threshold value (S913) and, if it is less than the threshold value (S913: NO), the log information based on the received event information or operational state information is generated by the responsible core (S915) and the generated log information is stored in the local memory 122 (S916). On the other hand, if the load of the responsible core is equal to or greater than the threshold value (S913: YES), after the load of the responsible core is distributed to another core (S914), the log information based on the received event information or operational state information is generated by the responsible core (S915) and the generated log information is stored in the local memory 122 (S916). The above-mentioned load distribution is performed by re-queuing the I/O process queued in the process queue of the responsible core into a process queue of another core, for example.

As above, when the load of the responsible core is high, after the load of the responsible core is distributed, the log information is generated by the responsible core and stored in the local memory 122. This can prevent the process for generating the log information from affecting the service provided by the host apparatus 2.

The failure detection processing unit 812 depicted in FIG. 8 monitors the log information stored in the local memory 122 as needed and, when detecting a critical failure (specific failure) in the storage apparatus 10, the failure detection processing unit 812 notifies the maintenance terminal 3 of the detection. When detecting a critical important failure, the failure detection processing unit 812 transfers the log information stored in the local memory 122 to the SVP 20 via the communication network 52.

Figure 10:
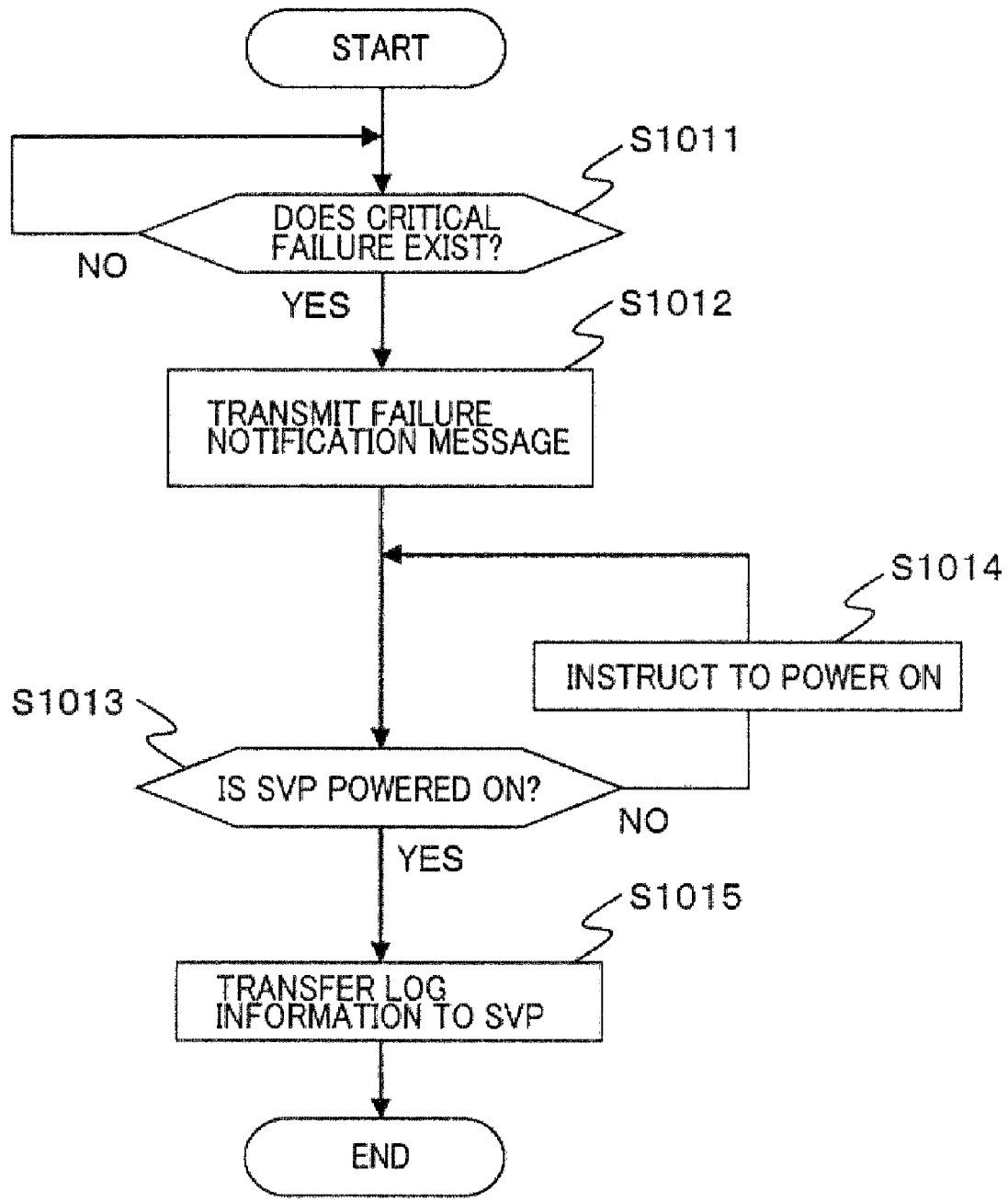
FIG. 10 is a flowchart for explaining a failure detecting process S1000.

FIG. 10 is a flowchart for explaining a process (hereinafter referred to as failure detecting process S1000) performed by the failure detection processing unit 812. The failure detection processing unit 812 refers to the log information stored in the local memory 122 as needed to monitor whether or not a critical failure has occurred in the storage apparatus 10 as needed (S1011).

When it is determined in the above-mentioned monitoring that a critical failure has occurred in the storage apparatus 10 (S1011: YES), the failure detection processing unit 812 transmits a message notifying the detection to the maintenance terminal 3 via the communication network 52 and the communication network 53 (S1012). Therefore, a maintenance personnel and the like is enabled to promptly notice that a critical failure has occurred in the storage apparatus 10 and can quickly take necessary countermeasures against the failure.

The failure detection processing unit 812 then determines whether or not the SVP 20 is currently activated (whether or not the power supply is currently turned on and the service is being provided) (S1013). This determination is made in accordance with the presence/absence of a response to a test packet transmitted from the processor substrate 12 to the SVP 20, for example.

If it is determined that the power supply of the SVP 20 is not currently activated (S1013: NO), the failure detection processing unit 812 transmits an instruction to power on the SVP 20 to the SVP monitoring unit 182 of the SSVP 18 via the communication line 54 (S1014). As a result, the control signal causing the power control unit 205 of the SVP 20 to power on the SVP 20 is transmitted from the SVP monitoring unit 182 to the SVP 20 via the communication line 55 and the power control unit 205 activates (starts supplying power to) the SVP 20.

When the failure detection processing unit 812 confirms the power-on of the SVP 20 (S1013: YES), transfers the log information stored in the local memory 122 to the SVP 20 (S1015). When receiving the log information, the SVP 20 stores the received log information into the storage device 202 of the SVP 20.

As above, when a critical failure occurs in the storage apparatus 10, a maintenance personnel or the like are automatically notified of the occurrence. Additionally, the log information is automatically transferred from the processor substrate 12 to the SVP 20. Therefore, the maintenance personnel or the like can access the log information immediately after arrival at the site (disposition location of the SVP 20 processor) and the maintenance personnel or the like can quickly take necessary countermeasures. After transferring the log information, the SVP 20 automatically migrates to the sleep state if no operation input and the like is performed to the SVP 20 within a predetermined time.

The log information transfer processing unit 813 depicted in FIG. 8 automatically transfers the log information stored in the local memory 122 to the SVP 20 through the communication network 52 when the preset date/time comes (regularly or irregularly).

Figure 11:
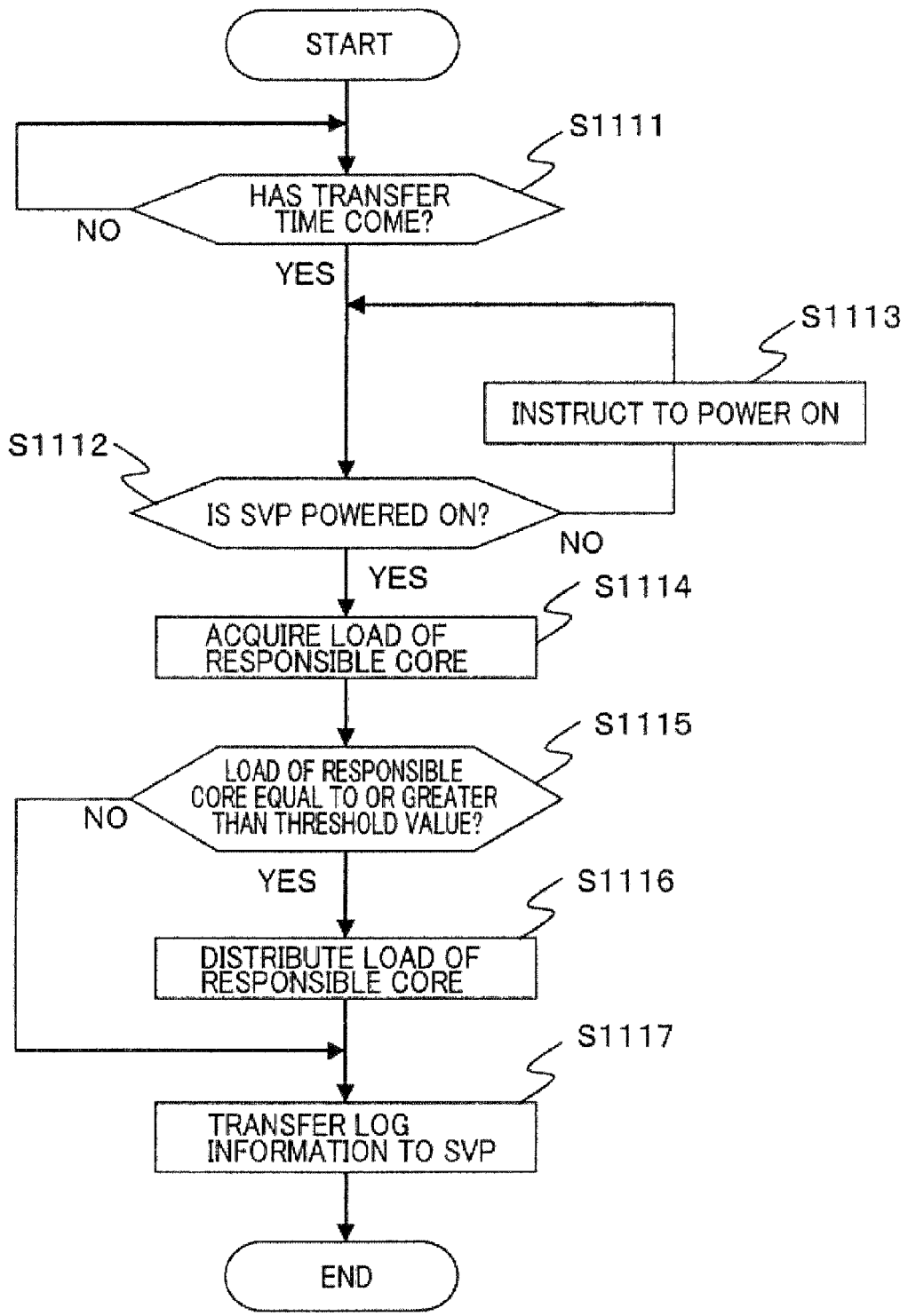
FIG. 11 is a flowchart for explaining a log information transferring process S1100.

FIG. 11 is a flowchart for explaining a process (hereinafter referred to as log information transferring process S1100) executed, at the time of transfer, by the log information transfer processing unit 813. The log information transfer processing unit 813 monitors whether or not the preset date/time has come (S1111). When the above-mentioned time comes (S1111: YES), the log information transfer processing unit 813 determines whether or not the SVP 20 is currently activated (S1112). This determination is made in accordance with the presence/absence of a response to a test packet transmitted from the processor substrate 12 to the SVP 20, for example.

If it is determined that the power supply of the SVP 20 is not currently activated (S1112: NO), the log information transfer processing unit 813 transmits an instruction for powering on the SVP 20 to the SVP monitoring unit 182 of the SSVP 18 via the communication line 54 (S1113). As a result, the control signal causing the power control unit 205 of the SVP 20 to power on the SVP 20 is transmitted from the SVP monitoring unit 182 to the power control unit 205 via the communication line 55 and the power control unit 205 activates (starts supplying power to) the SVP 20.

The log information transfer processing unit 813 confirms the power-on of the SVP 20 (S1112: YES) and acquires a current load (e.g., core utilization rate) of the core responsible for transferring the log information (hereinafter referred to as responsible core) among a plurality of the cores of the processor 121 (S1114).

Then the log information transfer processing unit 813 determines whether or not the acquired load is equal to or greater than a preset threshold value (S1115). If it is less than the threshold value (S1115: NO), the responsible core transfers the log information to the SVP 20 (S1117). On the other hand, if the load of the responsible core is equal to or greater than the threshold value (S1115: YES), after the load of the responsible core is distributed to another core (S1116), the responsible core transfers the log information to the SVP 20 (S1117). The above-described load distribution is performed by requeuing the I/O process queued in the process queue of the responsible core into a process queue of another core, for example. To ensure a storage capacity of the local memory 122 of the processor substrate 12, a garbage process is executed as needed to delete from the local memory 122 the log information already transferred to the SVP 20 of the log information stored in the local memory 122.

As above, the log information stored in the local memory 122 of the processor substrate 12 is automatically transferred to the SVP 20 when a preset date/time comes. Therefore, when activating the SVP 20 for maintenance and the like of the storage apparatus 10, a maintenance personnel or the like can immediately refer to the recently acquired log information without performing an operation for acquisition from the processor substrate 12 and the like. Therefore, the maintenance of the storage apparatus 10 and the recovery operation and the like at the time of a failure can be quickly performed. When the load of the responsible core is high, after the load of the responsible core is distributed, the responsible core transfers the log information to the SVP 20. This enables to prevent the process for generating the log information from affecting the service provided by the host apparatus 2.

The SVP recovery processing unit 814 depicted in FIG. 8 monitors the operational state of the SVP 20 as needed. When detecting a failure of the SVP 20, the SVP recovery processing unit 814 powers off and on the SVP 20 in an attempt to recover the SVP 20.

Figure 12:
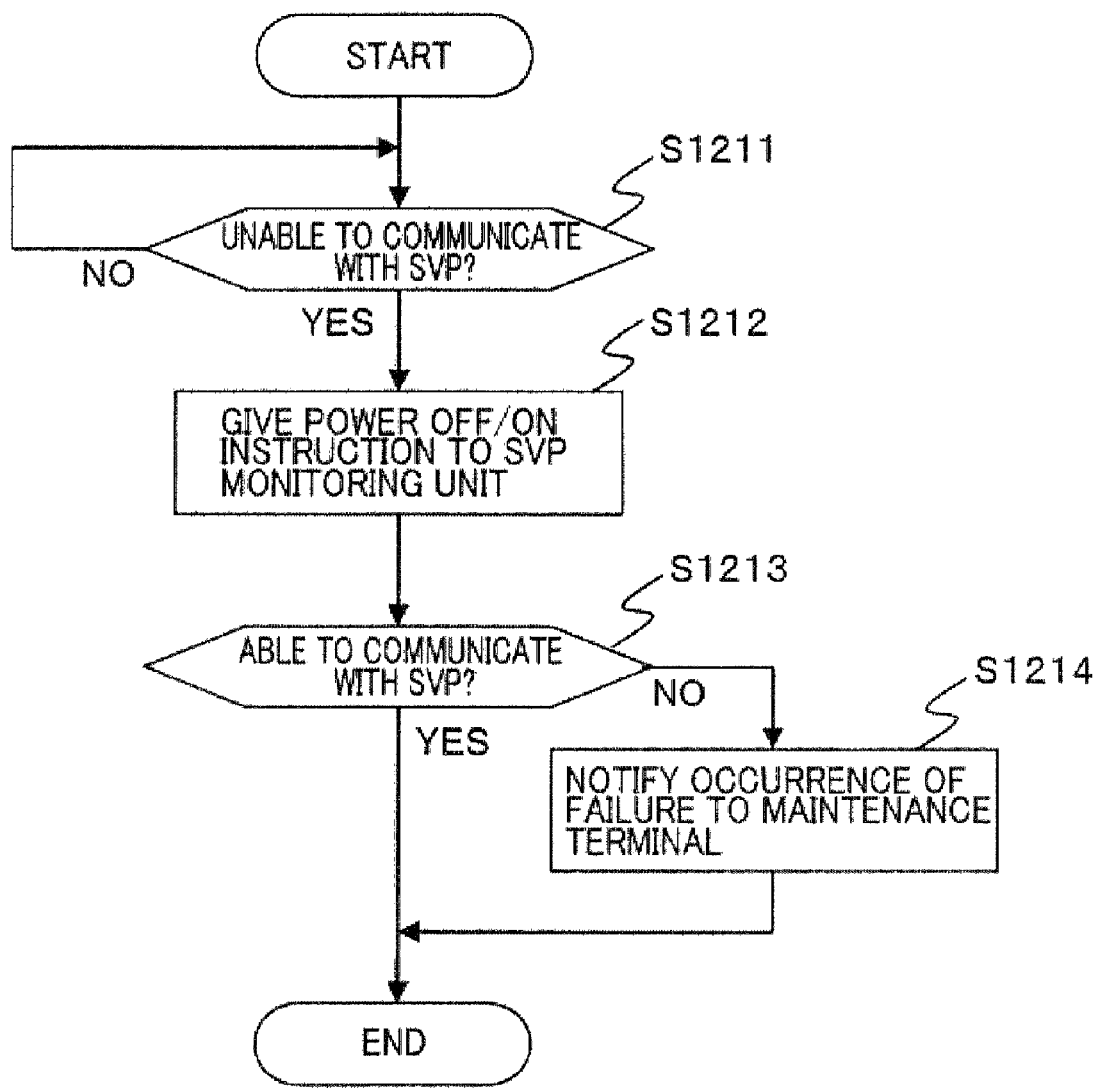
FIG. 12 is a flowchart for explaining an SVP recovering process S1200.

FIG. 12 is a flowchart for explaining a process (hereinafter referred to as SVP recovering process S1200) executed by the SVP recovery processing unit 814. While the service of the SVP 20 is provided (while powered on), the SVP recovery processing unit 814 monitors as needed whether or not communication is properly performed with the SVP 20 via the communication network 52 (whether or not the SVP 20 is operating properly) (S1211). This monitoring is performed, for example, by transmitting a request message from the processor substrate 12 to the SVP 20 and determining whether or not a response message to this message can be properly received.

When detecting an abnormality in the communication with the SVP 20 (S1211: YES), the SVP recovery processing unit 814 transmits an instruction for powering off and on the SVP 20 to the SVP monitoring unit 182 of the SSVP 18 through the communication line 54 (S1212). As a result, a control signal causing the power control unit 205 of the SVP 20 to power off and on the SVP 20 is transmitted from the SVP monitoring unit 182 and the power control unit 205 turns off and on the SVP 20.

The SVP recovery processing unit 814 waits for a predetermined time to determine whether or not the SVP 20 has properly recovered (S1213). When the SVP 20 has properly recovered (S1213: YES), the process is terminated. On the other hand, if the proper recovery of the SVP 20 is not confirmed (S1213: NO), the SVP recovery processing unit 814 transmits a message to the maintenance terminal 3 via the communication network 52 and the communication network 53 to indicate that a failure has occurred in the SVP 20 (S1214). In this way, a maintenance personnel or the like is notified that a failure has occurred in the SVP 20.

As above, when the SVP 20 is in the activated state, the processor substrate 12 monitors the operational state of the SVP 20 as needed and automatically powers off and on the SVP 20 in an attempt to recover the SVP 20 when it is determined that the SVP 20 is not operating properly. Therefore, the reliability and the availability of the SVP 20 can be improved. When the SVP 20 does not recover, the processor substrate 12 notifies the maintenance terminal 3 of the failure in the SVP 20. Therefore, a maintenance personnel or the like can be promptly notified of a failure in the SVP 20 and can quickly take necessary countermeasures.

<Sharing of SVP>

Figure 13:
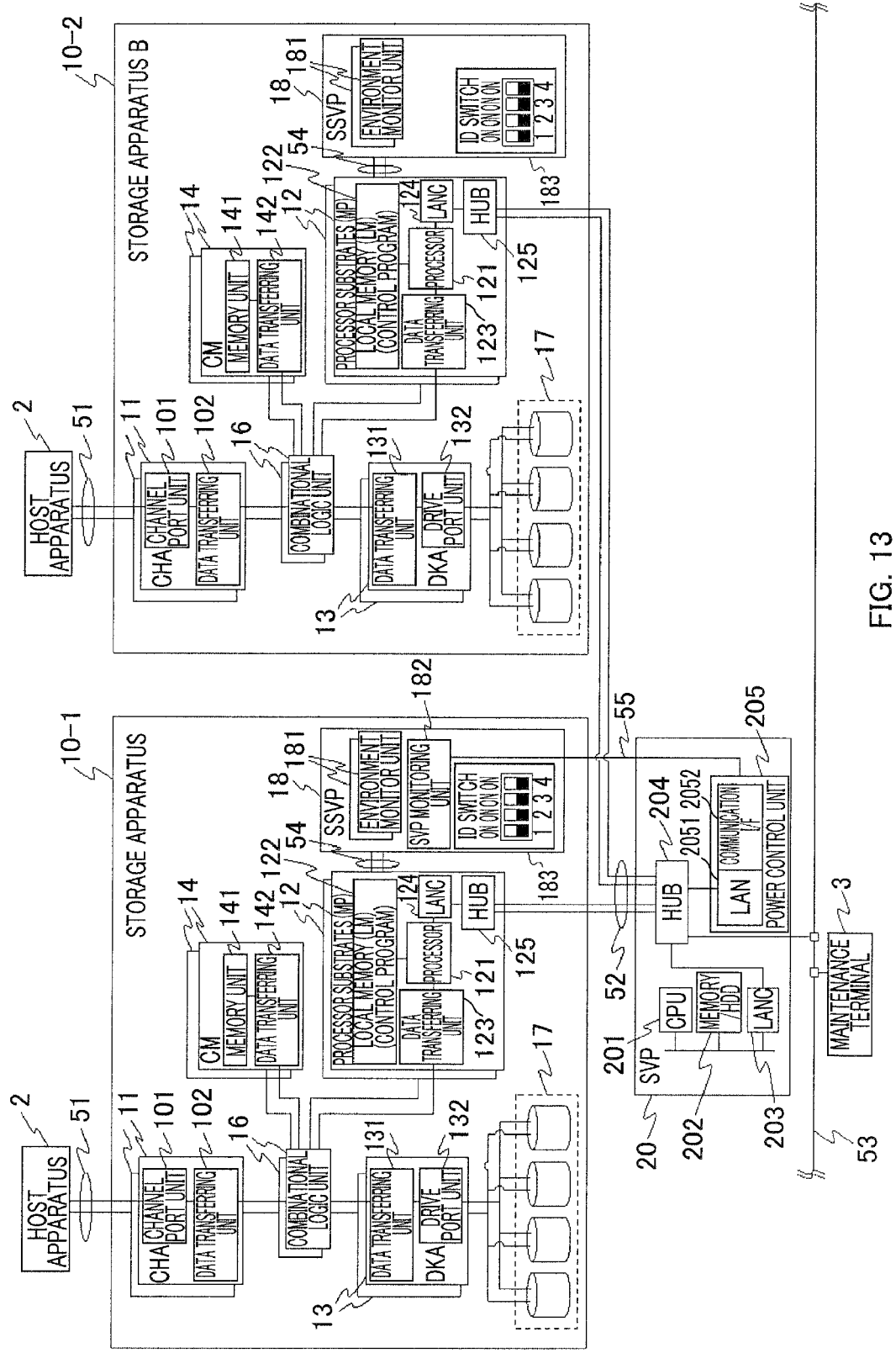
FIG. 13 is a diagram of an example of coupling of an SVP 20 shared by two storage apparatuses 10-1 and 10-2.

The SVP 20 in the storage system 1 of the present embodiment is sharable by a plurality of the storage apparatuses 10. FIG. 13 depicts an example of coupling of the SVP 20 to be shared by two storage apparatuses 10-1 and 10-2. Besides the configuration of the SSVP 18, each of the storage apparatus 10-1 and the storage apparatus 10-2 includes the configuration of the aforementioned storage apparatus 10. The respective processor substrates 12 of the storage apparatuses 10-1 and 10-2 have the functions of the log information acquiring unit 811, the failure detection processing unit 812, the log information transfer processing unit 813, and the SVP recovery processing unit 814 depicted in FIG. 8 and the above processes (the processes depicted in FIGS. 9 to 12) explained with the storage apparatus 10 are executed.

For example, the storage apparatuses 10 execute the process (the process depicted in FIG. 9) executed by the log information acquiring unit 811 and the log information of the storage apparatuses 10 is stored in the local memories 122 of the storage apparatuses 10.

As depicted in FIG. 13, the SSVP 18 does not include the SVP monitoring unit 182 in the storage apparatus 10-2, and the storage apparatus 10-2 utilizes the SVP monitoring unit 182 of the storage apparatus 10-1 via the communication network 52. Therefore, for example, when the storage apparatus 10-2 not including the SVP monitoring unit 182 attempts to control (turn on or off) the power supply of the SVP 20 at S1014 of FIG. 10, S1113 of FIG. 11, and S1212 of FIG. 12, the storage apparatus 10-2 not including the SVP monitoring unit 182 requests the storage apparatus 10-1 including the SVP monitoring unit 182 to control the power supply of the SVP 20 via the communication network 52.

When the SVP 20 is configured to be shared by a plurality of storage apparatuses 10 as above, the number of SVPs 20 can be reduced and the operational cost of the storage system 1 can be reduced. Additionally, the failure rate of the SVP 20 can be reduced and the reliability and the availability of the storage system 1 can be improved. By providing the SVP monitoring unit 182 only to a certain storage apparatus 10 as above, the configuration of the SSVP 18 may be simplified, resulting in reduction of operational cost and reduction of the failure rate of the SSVP 18.

<Address Management Method>

When a single SVP 20 is responsible for managing a plurality of storage apparatuses 10 as above, unique network addresses needs to be designated to the storage apparatuses 10 coupled to the communication network 52 to enable communication between the SVP 20 and the processor substrates 12 and between the processor substrates 12 via the communication network 52. With regard to the designation of network addresses, in PTL 1 above, although the fourth octet of an IP address (IPv4) designated to the MPU of the storage controller for management by the SVP is unique within the same storage apparatus, the fourth octet is in common with other storage controllers so that the respective storage controllers must be differentiated by the second octet and the third octet of the IP addresses. Therefore, if a plurality of storage controllers attempts to share the SVP in the arrangement of Patent Document 1, the management of the communication network becomes complicated due to differences in the typical IP address management system (a management system prescribed by NIC (internet's Network Information Center)). Therefore, the storage system 1 of the present embodiment includes the following arrangement.

Figure 14:
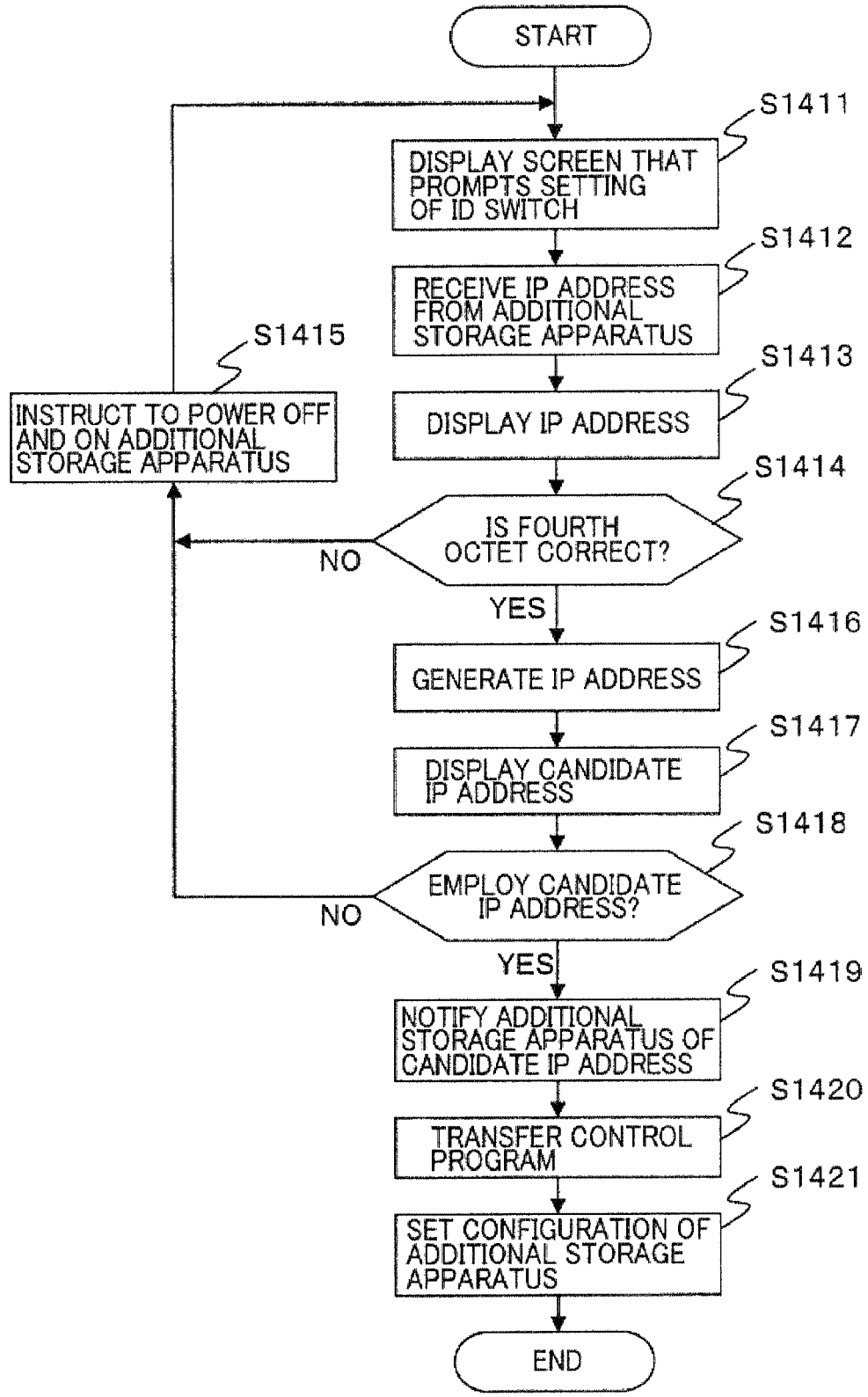
FIG. 14 is a flowchart for explaining an address setting process S1400.

FIG. 14 is a flowchart for explaining a process (hereinafter referred to as address setting process S1400) executed with a central focus on the SVP 20 when a new storage apparatus 10 is additionally provided to the storage system 1, in the above assembly. The address setting process S1400 will hereinafter be described with reference to FIG. 14.

First, after physically coupling the new storage apparatus 10 (hereinafter referred to as additional storage apparatus 10) to the communication network 52 of the storage system 1, a maintenance personnel or the like performs a predetermined operation for the SVP 20 to start setting an IP address to the additional storage apparatus 10.

The SVP 20 displays a screen that prompts setting of the ID switch 183 of the additional storage apparatus 10 (FIG. 15) in accordance with the above-described operation (S1411). The maintenance personnel or the like follows the guide on the screen to set the ID switch 183 of the additional storage apparatus 10 and then powers on the additional storage apparatus 10.

When the additional storage apparatus 10 is powered on, the environment monitoring unit 181 of the SSVP 18 of the additional storage apparatus 10 generates a fourth octet of an IP address based on the value of the ID switch 183 and an address allocation management table 187 retained by the SSVP 18. The environment monitoring unit 181 automatically generates an IP address using the generated fourth octet as a fourth octet and the first to third octets retained by default as first to third octets and notifies the processor substrate 12 of the generated IP address.

FIG. 16 depicts an example of an address allocation management table 187. As depicted in FIG. 16, the address allocation management table 187 manages correlations between the values of the ID switch 183 and the fourth octet values. The contents of the address allocation management table 187 are set by a maintenance personnel or the like utilizing the SVP 20 and the maintenance terminal 3.

The processor substrate 12 notifies the SVP 20 of the IP address notified from the environment monitoring unit 181 and the SVP 20 receives this IP address (S1412). This notification is performed by a protocol on a layer lower than the IP address, for example.

The SVP 20 receives the IP address and displays a screen listing the received IP addresses (FIG. 17). The maintenance personnel or the like refers to the screen to check whether or not the fourth octet value of the IP address value is correct (S1414). When the maintenance personnel or the like performs input to indicate that the fourth octet value is not correct (S1414: NO), the SVP 20 displays an instruction for prompting to power off and on the additional storage apparatus 10 (S1415) and then goes back to the process from S1411.

Figure 18:
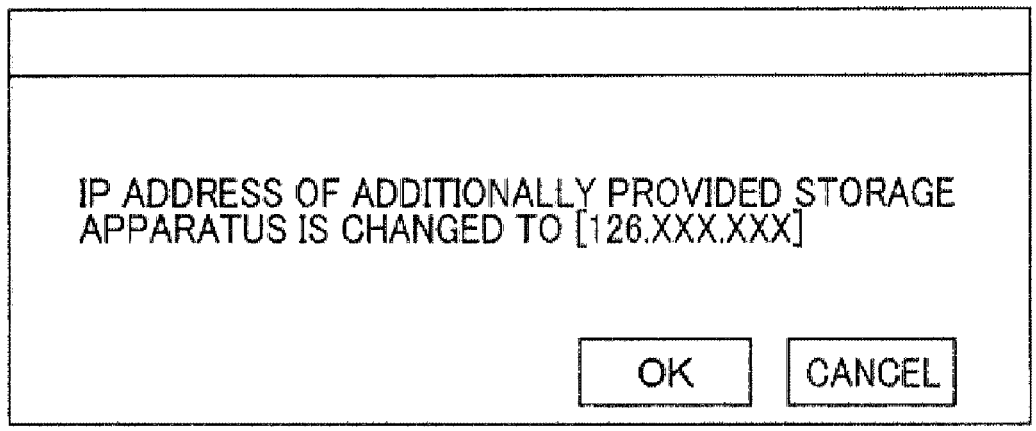
FIG. 18 is a diagram of an example of a screen displayed by the SVP 20 to prompt a confirmation of whether or not an IP address is to be employed.

On the other hand, when the maintenance personnel or the like performs input to indicate that the fourth octet value is correct (S1414: YES), the SVP 20 generates an IP address using the first to third octets of the IP address designated thereto for the communication network 52 and the fourth octet value received from the processor substrate 12 as the fourth octet (S1416) and displays the generated IP address (hereinafter referred to as candidate IP address) to query whether the IP address may be employed or not (S1417). FIG. 18 depicts an example of a screen displayed on this occasion. When the maintenance personnel or the like performs an input for this display not to employ the candidate IP address (S1418: NO), the SVP 20 displays an instruction for prompting powering off and on of the additional storage apparatus 10 (S1415) and returns to the process from S1411.

On the other hand, when the maintenance personnel or the like performs an input to employ the candidate IP address, the SVP 20 displays a screen indicating the IP address setting contents (an example is depicted in FIG. 19) and notifies the processor substrate 12 in the additional storage apparatus 10 of the candidate IP address via the communication network 52 (S1419). The address generating unit 815 receives the candidate IP address and sets the received candidate IP address as an IP address of a predetermined core of the processor substrate 12 of the additional storage apparatus 10.

When the IP address is set to the processor substrate 12 of the additional storage apparatus 10, the SVP 20 transfers programs and data for causing the additional storage apparatus 10 to function to the additional storage apparatus 10 via the communication network 52 (S1420). These programs and data are for the purpose of causing, for example, the channel substrate 11, the processor substrate 12, the drive substrate 13, and the cache memory 14 to function. The SVP 20 stores programs and data currently introduced (installed) in the existing storage apparatus 10 for the purpose of backup and the like. The SVP 20 transfers the programs and data stored to the additional storage apparatus 10 to match the program and data contents (versions) between the existing storage apparatus 10 and the additional storage apparatus 10.

The SVP 20 performs various settings associated with the expansion of the storage system 1 with the additional storage apparatus 10 (S1421). These settings are, for example, a capacity setting of a logical unit (LU), a setting of correlation between the logical unit and a logical device (LDEV), a setting of a path at the time of access from the host apparatus 2 to the logical unit, a setting of zoning, and a setting related to security.

As above, the SVP 20 automatically generates a candidate IP address using the fourth octet based on the setting value of the ID switch 183 provided to the SSVP 18 of the additional storage apparatus 10 as a fourth octet and the second octet and the third octet of the IP address currently designated to the SVP 20 in the communication network 52 as a second octet and a third octet and sets the generated candidate IP address as an IP address of the processor substrate 12 of the additional storage apparatus 10 in the communication network 52.

As above, in the storage system 1 of the present embodiment the storage apparatuses 10 to be managed by the SVP 20 via the communication network 52 has IP addresses whose fourth octet values differ from each of the respective storage apparatuses 10, as is the case with a typical network address designation method. Therefore, the storage system 1 can flexibly correspond to an expansion of the storage apparatus 10 and changes in configuration of the communication network in the storage system 1.

=Adding Redundancy to Shared SVP=

Figure 20:
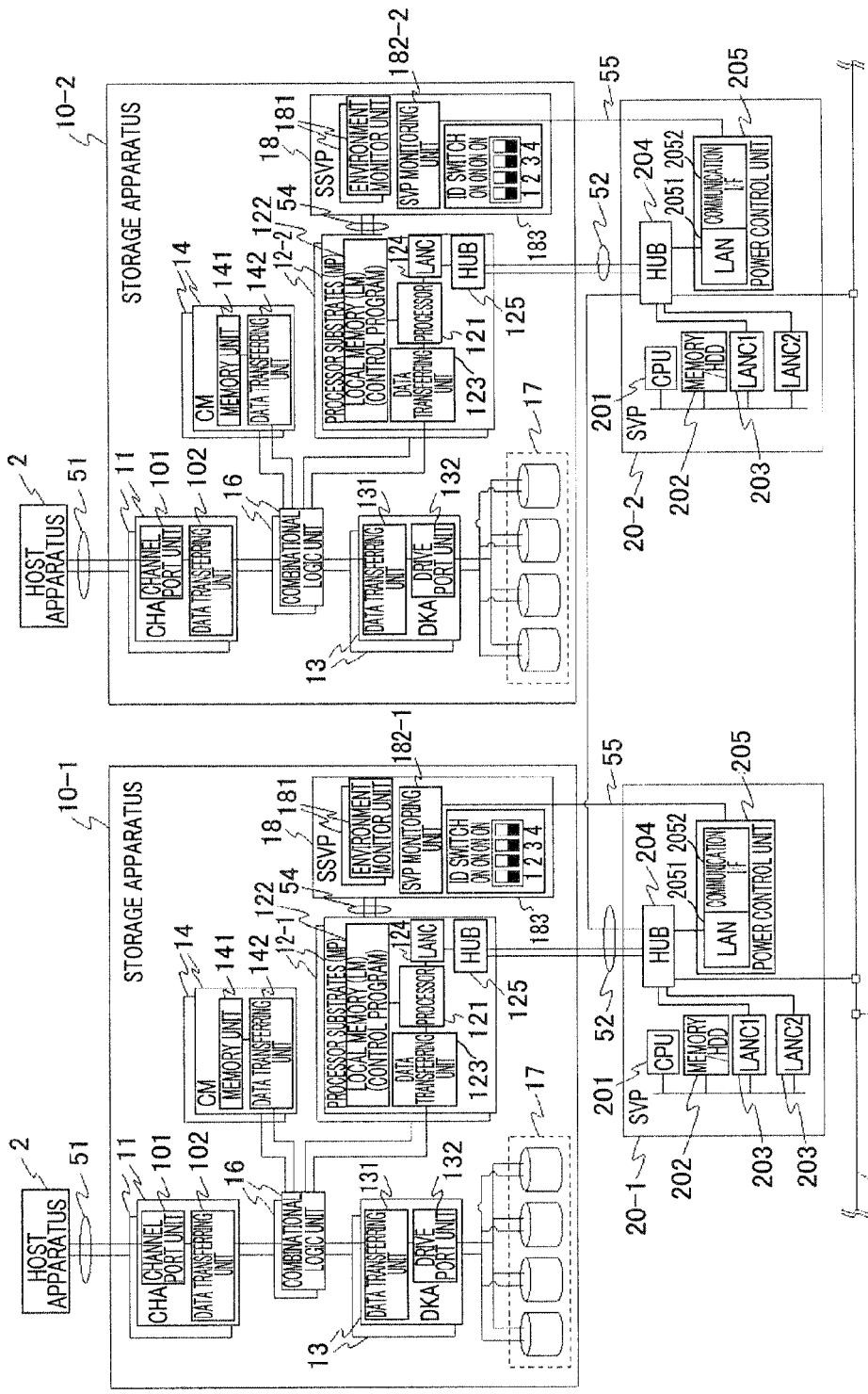
FIG. 20 is a diagram of an exemplary configuration making the SVP 20 redundant.

A plurality of the SVPs 20 shared by a plurality of the storage apparatuses 10 can be coupled to operate the SVPs 20 in a redundant manner. FIG. 20 depicts an exemplary configuration with the SVP 20 made redundant.

In the storage system 1 depicted in FIG. 20, an SVP 20-1 responsible for managing the storage apparatus 10-1 is coupled via the communication network 52 to an SVP 20-2 responsible for managing the storage apparatus 10-2. When a failure occurs in the SVP 20-1, the SVP 20-2 provides services in substitution for the SVP 20-1 and when a failure occurs in the SVP 20-2, the SVP 20-1 provides services in substitution for the SVP 20-2.

As depicted in FIG. 20, both the SVP 20-1 and the SVP 20-2 include a plurality of the LANCs 203 (communication control units). Respective network addresses (IP addresses and subnet masks) are set such that one of the two LANCs 203 of the SVP 20-1 becomes capable of communicating with the storage apparatus 10-1 and that the other LANC 203 becomes capable of communicating with the SVP 20-2. Respective network addresses (IP addresses and subnet masks) are also set for the SVP 20-2 such that one of the two LANCs 203 becomes capable of communicating with the storage apparatus 10-2 and that the other LANC 203 becomes capable of communicable with the SVP 20-1.

The SVP 20-1 and the SVP 20-2 transfer to each other configuration information and log information stored respectively therein as needed to synchronize the contents of the configuration information and the log information retained by the SVPs 20. For example, when the configuration information and the log information are transferred to the one SVP 20-1 from the storage apparatus 10-1, after the SVP 20-2 is activated (powered on) by transmitting a control signal from the SVP 20-1 to the SVP 20-2 via the communication network 52, the log information is transferred from the SVP 20-1 to the SVP 20-2. The same applies to the case where the configuration information and the log information retained by the SVP 20-2 are changed.

FIG. 21 depicts an example of configuration information and log information stored in each of the local memories 122 of the SVPs 20-1, 20-2. As depicted in FIG. 21, each of the local memories 122 of the SVPs 20-1, 20-2 stores, the configuration information and the log information of the storage apparatus 10 to be managed by each SVP ("Master" in FIG. 21) and the configuration information and the log information of the storage apparatus 10 to be managed by the other SVP 20 in the redundant configuration ("Slave" in FIG. 21), in a classified manner for each of the core processors 1211 (each of the IP addresses in FIG. 21) of the processors 121 of the processor substrates 12.

<Mutual Monitoring of Operational State>

The operational state can be mutually monitored between the SVPs 20-1, 20-2 made redundant. If the one SVP 20-1 detects that a failure has occurred in the other SVP 20-2, the one SVP 20-1 can transmit an instruction to power off and on the other SVP 20-2 to a processor substrate 12-2 of the storage apparatus 10-2 to be managed by the other SVP 20-2 and the processor substrate 12-2 can transmit a control signal to power off and on the other SVP 20-2 to an SVP monitoring unit 182-2 of the above-described storage apparatus 10-2 in an attempt to recover the other SVP 20-2.

Figure 22:
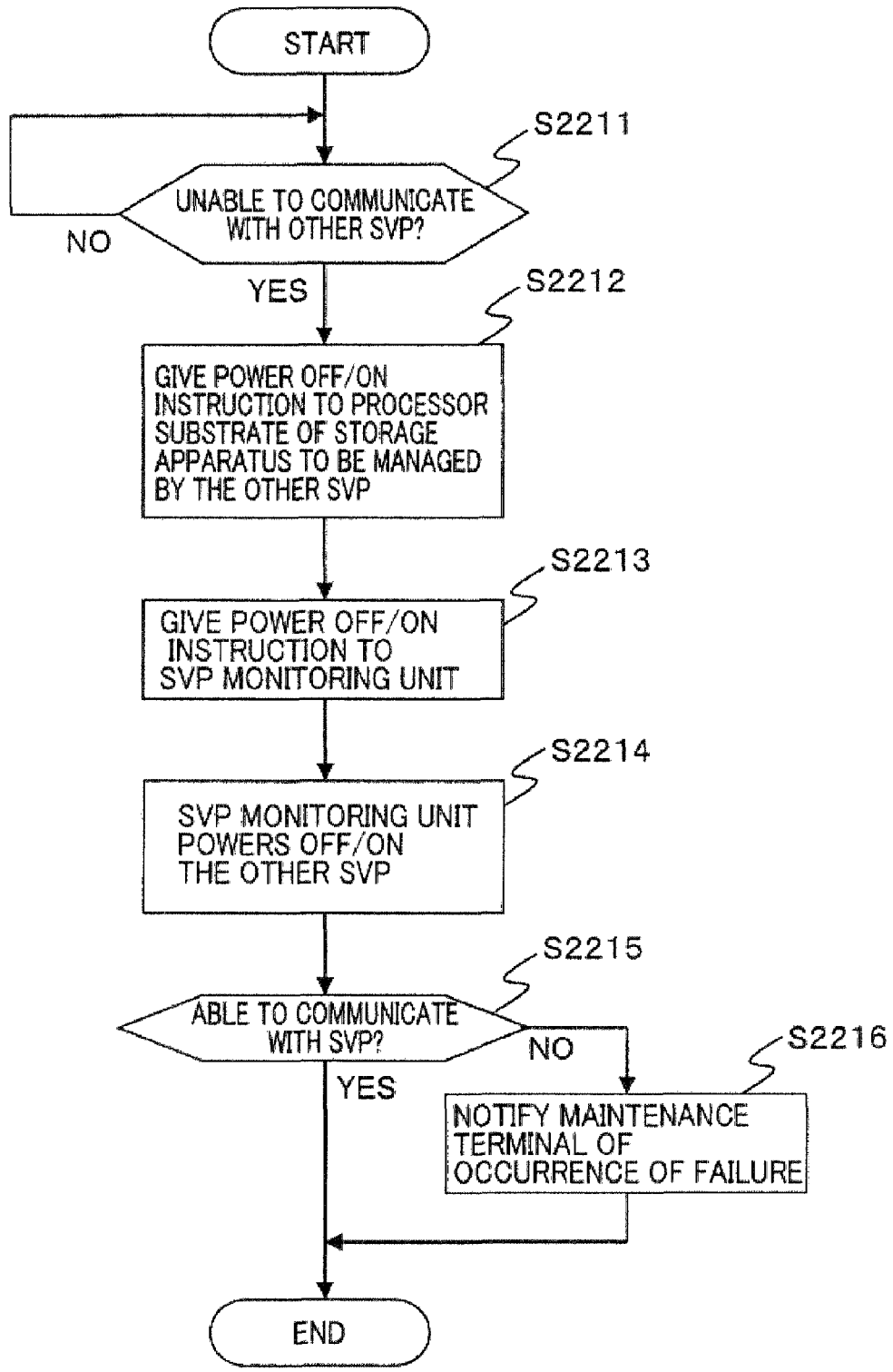
FIG. 22 is a flowchart for explaining an inter-SVP recovering process S2200.

FIG. 22 is a flowchart for explaining a process (hereinafter referred to as inter-SVP recovering process S2200) executed in this case in the storage system 1. The inter-SVP recovering process S2200 will hereinafter be described with reference to FIG. 22.

The SVP 20-1 monitors the operational state of the SVP 20-2 as needed (S2211). For example, when the SVP 20-1 detects that a failure has occurred in the SVP 20-2 (S2211: YES), an instruction to power off and on the SVP 20-2 is transmitted to the processor substrate 12-2 of the storage apparatus 10-2 to be managed by the SVP 20-2 via the communication network 52 (S2212). The processor substrate 12-2 transmits a control signal to power off and on the SVP 20-2 to the SVP monitoring unit 182-2 of the storage apparatus 10-2 in accordance with the above-mentioned instruction (S2213). The above-mentioned SVP monitoring unit 182-2 powers off and on the SVP 20-2 in accordance with the above-mentioned control signal (S2214).

The SVP 20-1 monitors whether or not the SVP-20 has recovered (S2215). When the SVP 20-1 detects the recovery of the SVP 20-2 (S2215: YES), the process is terminated. On the other hand, when the recovery of the SVP 20-2 cannot be detected even after a predetermined standby time (S2215: NO), the SVP recovery processing unit 814 transmits to the maintenance terminal 3 a message indicating that a failure has occurred in the SVP 20-2 (S2216).

<Maintenance Screen>

Figure 23:
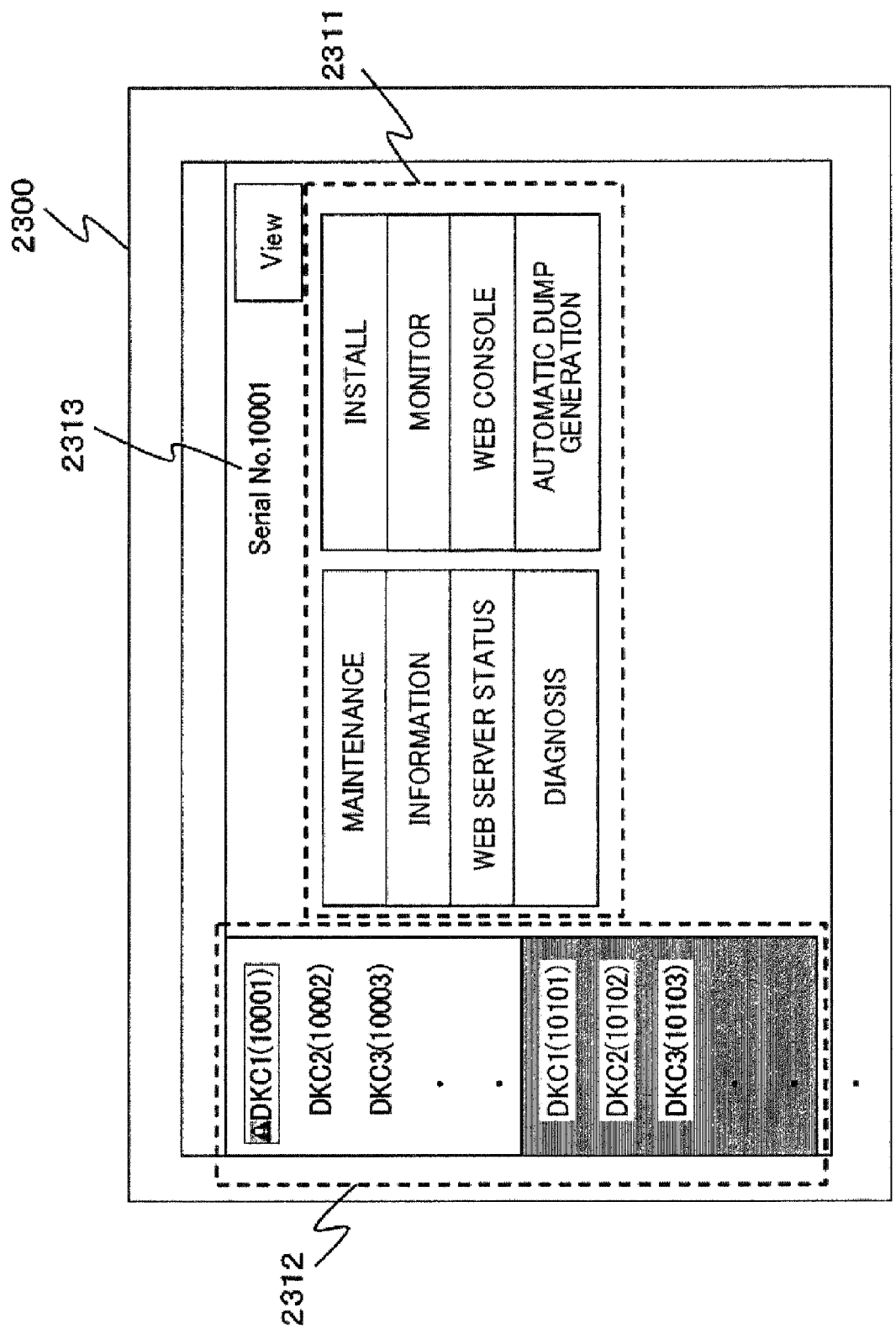
FIG. 23 is a diagram of an example of a maintenance screen 2300.

FIG. 23 depicts an example of a maintenance screen displayed by the SVP 20 for operation by a maintenance personnel or the like. As depicted in FIG. 23, the maintenance screen 2300 displays menu items 2311 for setting, controlling, monitoring, and the like of the storage apparatus 10. An area on the left 2312 of the maintenance screen 2300 displays a list of identifiers of the storage apparatuses 10-1 to be managed by the SVP 20-1 and identifiers of the storage apparatuses 10-2 to be managed by the another SVP 20-2 made redundant with the SVP 20-1.

Among the identifiers of the storage apparatuses 10 displayed in the area on the left 2312, the storage apparatuses 10-1 to be managed by the SVP 20-1 can be selected by operating a user interface such as a mouse. When an identifier is selected, information specifying the selected identifier is displayed in an upper right field 2313 of the maintenance screen 2300. The menu items 2311 displayed on the maintenance screen 2300 are the menu items 2311 for the storage apparatus 10 selected in the area on the left 2312. The maintenance personnel or the like selects the identifier to select the intended storage apparatus 10.

Among the identifiers of the storage apparatuses 10 displayed in the area on the left 2312, identifiers of the storage apparatuses 10-2 to be managed by the other SVP 20-2 forming a redundant configuration with the SVP 20-1 are normally only displayed and not selectable (shaded identifiers displayed in the area on the left 2312). However, when a failure of the other SVP 20-2 has been detected in the above-described inter-SVP recovering process S2200, the identifiers of the storage apparatuses 10-2 to be managed by the other SVP 20-2 become selectable. That is, during a failure in the other SVP 20-2, the maintenance personnel or the like can utilize the maintenance screen 2300 of the SVP 20-1 to perform setting, controlling, monitoring and the like of the storage apparatuses 10 to be managed by the other SVP 20-2 in which a failure has occurred. Since the storage apparatuses 10-2 to be managed by the other SVP 20-2 are only displayed and are usually not selectable, erroneous setting and erroneous control can be prevented for the storage apparatuses 10-2 to be managed by the other SVP 20-2.

As above, the storage system 1 of the present embodiment can combine SVPs 20 shared by a plurality of storage apparatuses 10 to make the SVPs 20 redundant. Therefore, it is not necessary to additionally provide a SVP 20 for redundancy and thus reliability and availability of the storage system can be ensured at a low cost.

Although the present embodiments have been described as above, the above-described embodiments are for the purpose of facilitating the understanding of the present invention and are not for construing the present invention in a limited manner. The present invention may be changed or altered without departing from the spirit thereof and the present invention includes equivalents thereof. For example, in the embodiments described above, the method of communication performed between the apparatuses is not limited to a wired method and can be implemented with a wireless method.

In the above embodiments, although the SSVP 18 is made to store the address allocation management table 187 and the SSVP 18 to generate the IP address based on the set value of the ID switch 183, the address allocation management table 187 can be retained on the processor substrate 12 and the SSVP 18 can notify the processor substrate 12 of only the set value of the ID switch 183 such that the processor substrate 12 generates the IP address based on the acquired set value mentioned above and the address allocation management table 187.

REFERENCE SIGNS LIST 1 storage system
2 host apparatus
3 maintenance terminal
10 storage apparatus
11 channel substrate
12 processor substrate
13 drive substrate
14 cache memory
16 combinational logic unit
17 storage device
122 local memory
123 memory
171 storage drive
18 SSVP
181 environment monitoring unit
182 SVP monitoring unit
183 ID switch
187 address allocation management table
20 SVP
205 power control unit
52 communication network
54 communication line
811 log information acquiring unit
812 failure detection processing unit
813 log information transfer processing unit
814 SVP recovery processing unit

The invention claimed is:

1. A storage system comprising:
a plurality of storage apparatuses, each including
one or more channel substrates that receive a data I/O request sent from an external apparatus,
one or more drive substrates that write data into a storage device configured of a plurality of storage drives or that read data from the storage device,
a cache memory that stores write data to be written into the storage device or read data read from the storage device,
a processor substrate that is responsible for data transfer performed between at least any of the channel substrate, the drive substrate, and the cache memory,
a sub-service processor that has an environment monitor unit to acquire operation state information that is information indicative of an operational state and a service processor monitoring unit to monitor a service processor, the sub-service processor being communicatively coupled to the processor substrate,
a service processor including,
a communication control unit communicatively coupled via a communication network to the respective processor substrates of the storage apparatuses, and
a power control unit communicatively coupled via a communication line to the sub-service processor, the power control unit powering off or on the service processor according to a control signal sent from the service processor monitoring unit via the communication line, the service processor managing the plurality of the storage apparatuses,
wherein the sub-service processor includes an address setting unit that is a user interface for setting a fourth octet of an IP address designated to the processor substrate in the communication network and generates the fourth octet based on a set value of the address setting unit,
wherein the processor substrate acquires the fourth octet from the sub-service processor and transmits the acquired fourth octet to the service processor,
wherein the service processor generates an IP address using the fourth octet as a fourth octet and transmits the generated IP address to the processor substrate, and
wherein the processor substrate receives the IP address and sets the received IP address as the network address of the processor substrate in the communication network.

2. A storage system comprising:
a plurality of storage apparatuses, each including
one or more channel substrates that receive a data I/O request sent from an external apparatus,
one or more drive substrates that write data into a storage device configured of a plurality of storage drives or that read data from the storage device,
a cache memory that stores write data to be written into the storage device or read data read from the storage device,
a processor substrate that is responsible for data transfer performed between at least any of the channel substrate, the drive substrate, and the cache memory, a sub-service processor that has an environment monitor unit to acquire operation state information that is information indicative of an operational state and a service processor monitoring unit to monitor a service processor, the sub-service processor being communicatively coupled to the processor substrate, a service processor including, a communication control unit communicatively coupled via a communication network to the respective processor substrates of the storage apparatuses, and a power control unit communicatively coupled via a communication line to the sub-service processor, the power control unit powering off or on the service processor according to a control signal sent from the service processor monitoring unit via the communication line, the service processor managing the plurality of the storage apparatuses, wherein the sub-service processor includes an address setting unit that is a user interface for setting a fourth octet of an IP address designated to the processor substrate in the communication network and generates the fourth octet based on a set value of the address setting unit, wherein the processor substrate acquires the fourth octet from the sub-service processor and transmits the acquired fourth octet to the service processor, wherein the service processor generates an IP address using the fourth octet as a fourth octet and transmits the generated IP address to the processor substrate, wherein the processor substrate receives the IP address and sets the received IP address as the network address of the processor substrate in the communication network, wherein the processor substrate has a multi-core processor having a plurality of core processors individually communicable with the service processor via the communication interface, wherein the sub-service processor generates the fourth octets for the respective core processors based on the set value of the address setting unit, wherein the processor substrate acquires the fourth octets of the respective core processors from the sub-service processor and transmits the acquired fourth octets to the service processor, wherein the service processor generates IP addresses of the respective core processors using the fourth octets as fourth octets and transmits the generated IP addresses of the respective core processors to the processor substrate, wherein the processor substrate receives the IP addresses for the respective core processors and sets the received IP addresses of the respective core processors as IP addresses of the respective core processors in the communication network, wherein the processor substrate receives event information that is information relating to an event occurring in each of the channel substrate, the drive substrate, and the cache memory, receives the operational state information from the sub-service processor, generates and stores log information that is information based on the event information or the operational state information, and transmits the stored log information to the service processor via the communication network, wherein the service processor receives and stores the log information sent from each of the storage apparatuses, wherein the processor substrate acquires a load of each of the core processors when generating the log information, and when a load of the core processor responsible for generating the log information is equal to or greater than a preset threshold value, the processor substrate generates the log information with the core processor after distributing the load of the core processor to another core processor on the processor substrate, wherein the processor substrate acquires a load of each of the core processors when transmitting the log information to the service processor, and when a load of the core processor responsible for the transmission of the log information is equal to or greater than a preset threshold value, the processor substrate transmits the log information to the service processor with the core processor after distributing the load of the core processor to another core processor on the processor substrate, wherein the processor substrate monitors the log information as needed, determines via the communication network whether or not the service processor is powered off when detecting an occurrence of a certain failure in the storage apparatus from the monitoring, and transmits the log information to the service processor via the communication network after powering on the service processor via the communication line by controlling the service processor monitoring unit when the service processor is powered off, wherein the processor substrate monitors via the communication network as needed whether or not the service processor is operating properly and powers off and on the service processor via the communication line by controlling the service processor monitoring unit when it is determined that the service processor is not operating properly, wherein the storage system has a first one of the storage apparatuses including the service processor monitoring unit and a second one of the storage apparatuses not including the service processor monitoring unit, wherein the first storage apparatus and the second storage apparatus being communicatively coupled, wherein the processor substrate of the second storage apparatus monitors via the communication network as needed whether or not the service processor is operating properly and makes a request from the second storage apparatus to the first storage apparatus to power off and on the service processor to cause the first storage apparatus to power off and on the service processor via the communication line by controlling the service processor monitoring unit when it is determined that the service processor is not operating properly, wherein the storage system has a first one of the service processors communicatively coupled to a first one of the storage apparatuses to manage the first storage apparatus and a second one of the service processors communicatively coupled to a second one of the storage apparatuses to manage the second storage apparatus, wherein the first service processor and the second service processor are coupled via a communication network, wherein the first service processor and the second service processor transmit/receive the log information such that each of the service processors retains the log information stored in the other service processor, wherein the first service processor is communicatively coupled to the second storage apparatus, wherein the first service processor and the second service processor mutually monitor their operational states, when detecting that a failure has occurred in the second service processor, the first service processor powers off and on the second service processor by controlling the SVP monitoring unit of the second storage apparatus, and when detecting that a failure has occurred in the first service processor, the second service processor powers off and on the first service processor by controlling the service processor monitoring unit of the first storage apparatus.

3. The storage system of claim 1, wherein the processor substrate has a multi-core processor having a plurality of core processors individually communicable with the service processor via the communication interface,
wherein the sub-service processor generates the fourth octets for the respective core processors based on the set value of the address setting unit,
wherein the processor substrate acquires the fourth octets of the respective core processors from the sub-service processor and transmits the acquired fourth octets to the service processor,
wherein the service processor generates IP addresses of the respective core processors using the fourth octets of the core processors as fourth octets and transmits the generated IP addresses of the respective core processors to the processor substrate, and
wherein the processor substrate receives the IP addresses for the respective core processors and sets the received IP addresses of the respective core processors as IP addresses of the respective core processors in the communication network.

4. A storage system according to claim 1, wherein the processor substrate receives event information that is information relating to an event occurring in each of the channel substrate, the drive substrate, and the cache memory, and receives the operational state information from the sub-service processor, generates and stores log information that is information based on the event information or the operational state information, and transmits the stored log information to the service processor via the communication network, and
wherein the service processor receives and stores the log information sent from each of the storage apparatuses.

5. The storage system of claim 4, wherein the processor substrate has a multi-core processor having a plurality of core processors individually communicable with the service processor via the communication interface, and
wherein the processor substrate acquires a load of each of the core processors when generating the log information, and when a load of the core processor responsible for generating the log information is equal to or greater than a preset threshold value, the processor substrate generates the log information with the core processor after distributing the load of the core processor to another core processor on the processor substrate.

6. The storage system of claim 4, wherein the processor substrate has a multi-core processor having a plurality of core processors individually communicable with the service processor via the communication interface, and
wherein the processor substrate acquires a load of each of the core processors when transmitting the log information to the service processor, and when a load of the core processor responsible for the transmission of the log information is equal to or greater than a preset threshold value, the processor substrate transmits the log information to the service processor with the core processor after distributing the load of the core processor to another core processor on the processor substrate.

7. The storage system of claim 4, wherein the processor substrate monitors the log information as needed, determines via the communication network whether or not the service processor is powered off when detecting an occurrence of a certain failure in the storage apparatus from the monitoring, and transmits the log information to the service processor via the communication network after powering on the service processor via the communication line by controlling the service processor monitoring unit when the service processor is powered off.

8. The storage system of claim 1, wherein the processor substrate monitors via the communication network as needed whether or not the service processor is operating properly and powers off and on the service processor via the communication line by controlling the service processor monitoring unit when it is determined that the service processor is not operating properly.

9. A storage system comprising:
a plurality of storage apparatuses, each including
one or more channel substrates that receive a data input/output (I/O) request sent from an external apparatus,
one or more drive substrates that write data into a storage device configured of a plurality of storage drives or that read data from the storage device,
a cache memory that stores write data to be written into the storage device or read data read from the storage device,
a processor substrate that is responsible for data transfer performed between at least any of the channel substrate, the drive substrate, and the cache memory,
a sub-service processor that has an environment monitor unit to acquire operation state information that is information indicative of an operational state and a service processor monitoring unit to monitor a service processor, the sub-service processor being communicatively coupled to the processor substrate,
a service processor including,
a communication control unit communicatively coupled via a communication network to the respective processor substrates of the storage apparatuses,
a power control unit communicatively coupled via a communication line to the sub-service processor, the power control unit powering off or on the service processor according to a control signal sent from the service processor monitoring unit via the communication line, the service processor managing the plurality of the storage apparatuses,
a first one of the storage apparatuses including the service processor monitoring unit and a second one of the storage apparatuses not including the service processor monitoring unit,
wherein the first storage apparatus and the second storage apparatus being communicatively coupled,
wherein the processor substrate of the second storage apparatus monitors via the communication network as needed whether or not the service processor is operating properly and makes a request from the second storage apparatus to the first storage apparatus to power off and on the service processor to cause the first storage apparatus to power off and on the service processor via the communication line by controlling the service processor monitoring unit when it is determined that the service processor is not operating properly, and
wherein the processor substrate monitors via the communication network as needed whether or not the service processor is operating properly and powers off and on the service processor via the communication line by controlling the service processor monitoring unit when it is determined that the service processor is not operating properly.

10. The storage system of claim 4, comprising:
a first one of the service processors communicatively coupled to a first one of the storage apparatuses to manage the first storage apparatus; and
a second one of the service processors communicatively coupled to a second one of the storage apparatuses to manage the second storage apparatus,
wherein the first service processor and the second service processor are communicatively coupled via a communication network, and
wherein the first service processor and the second service processor transmit/receive the log information such that each of the service processors retains the log information stored in the other service processor.

11. The storage system of claim 10, wherein the first service processor is communicatively coupled to the second storage apparatus,
wherein the first service processor and the second service processor mutually monitor their operational states,
wherein the first service processor powers off and on the second service processor by controlling the service processor monitoring unit of the second storage apparatus when detecting that a failure has occurred in the second service processor, and
wherein the second service processor powers off and on the first service processor by controlling the SVP monitoring unit of the first storage apparatus when detecting that a failure has occurred in the first service processor.

12. An operating method of a storage system having a plurality of storage apparatuses including:
one or more channel substrates that receive a data I/O request sent from an external apparatus,
one or more drive substrates that write data into a storage device configured of a plurality of storage drives or that reads data from the storage device,
a cache memory that stores write data to be written into the storage device or read data read from the storage device,
a processor substrate that is responsible for data transfer performed between at least any of the channel substrate, the drive substrate, and the cache memory, and
a sub-service processor that has an environment monitor unit to acquire operation state information that is information indicative of an operational state and a service processor monitoring unit to monitor a service processor, the sub-service processor being communicatively coupled to the processor substrate, and
a service processor including,
a communication control unit communicatively coupled via a communication network to the respective processor substrates of the storage apparatuses, and
a power control unit communicatively coupled via a communication line to the sub-service processor, the power control unit powering off or on the service processor according to a control signal sent from the service processor monitoring unit via the communication line, the service processor managing the plurality of the storage apparatuses, the method comprising the steps of:
the sub-service processor including an address setting unit that is a user interface for setting a fourth octet of an IP address designated to the processor substrate in the communication network and generating the fourth octet based on a set value of the address setting unit;
the processor substrate acquiring the fourth octet from the sub-service processor and transmitting the acquired fourth octet to the service processor;
the service processor generating an IP address using the fourth octet as a fourth octet and transmitting the generated IP address to the processor substrate; and
the processor substrate receiving the IP address and setting the received IP address as the network address of the processor substrate in the communication network.

\* \* \* \* \*